(12) United States Patent
Cheng et al.

(10) Patent No.: US 10,149,172 B2
(45) Date of Patent: Dec. 4, 2018

(54) METHOD AND SYSTEM FOR NETWORK PLANNING IN FIXED WIRELESS BACKHAUL NETWORKS

(71) Applicant: BLiNQ WIRELESS INC., Kanata (CA)

(72) Inventors: Ho Ting Cheng, Stittsville (CA); Terasan Niyomsataya, Ottawa (CA); Radu Bogdan Selea, Vaughan (CA)

(73) Assignee: BLiNQ Wireless Inc., Kanata (CA)

( * ) Notice: Subject to any disclaimer, the term of this patent is extended or adjusted under 35 U.S.C. 154(b) by 680 days.

(21) Appl. No.: 14/643,389

(22) Filed: Mar. 10, 2015

(65) Prior Publication Data

US 2016/0269911 A1    Sep. 15, 2016

(51) Int. Cl.
*H04W 16/18* (2009.01)
*H04W 84/04* (2009.01)

(52) U.S. Cl.
CPC .......... *H04W 16/18* (2013.01); *H04W 84/045* (2013.01)

(58) Field of Classification Search
CPC .... H04W 16/18; H04W 24/08; H04W 84/045
See application file for complete search history.

(56) References Cited

U.S. PATENT DOCUMENTS

| | | | | |
|---|---|---|---|---|
| 6,181,917 B1* | 1/2001 | Mansour | ............... | H04W 16/18 455/423 |
| 9,351,126 B2* | 5/2016 | Kenington | ............ | H04W 4/043 |
| 9,398,480 B2* | 7/2016 | Siomina | ................ | H04W 24/10 |
| 9,503,216 B2* | 11/2016 | Siomina | ................ | H04L 1/0015 |
| 9,654,935 B2* | 5/2017 | Kenington | ............ | H04W 4/043 |
| 2012/0236731 A1* | 9/2012 | Beaudin | .............. | H04W 72/082 370/248 |

OTHER PUBLICATIONS

3GPP TR 36.932 V12.1.0 (Mar. 2013), Scenarios and requirements for small cell enhancements for E-UTRA and E-UTRAN.*

* cited by examiner

*Primary Examiner* — Gregory B Sefcheck
(74) *Attorney, Agent, or Firm* — de Wilton Intellectual Property Inc.

(57) ABSTRACT

Systems and methods are disclosed for networking planning for fixed backhaul networks comprising a plurality of hubs, each serving one or more RBMs. The method comprises one or more of terrain pathloss (PL) and antenna gain prediction; network design comprising site association, hub dimensioning and pointing; and optimization of small cell (SC) deployment. PL prediction is based on correlation of user input parameters with reference use cases for channel models for each of downtown, urban, and suburban deployment scenarios. Rapid and effective network planning is achieved with limited input data, even in the absence of high resolution digital maps or building polygons, by selecting the channel model having a highest correlation with available environmental parameters. Optimization of network topology design, system design, and SC deployment, with both access link and backhaul link evaluation, is based on optimization of a sum-utility function across all links for feasible SC site locations.

17 Claims, 36 Drawing Sheets

1.0 Terrain PL Prediction Workflow

1.1 Use case identification
Example reference use cases for channel models based on elevation and clutter height maps Downtown Urban Suburban

1.2 Link type determination

Link Type evaluation
based on Fresnel Zone

Example: p=40% obstruction allowance

Link type evaluation example 1:
Washington DC – Urban n=0
Elevation
map
LOS n=0
Elevation +
clutter height
maps
LOS

Hub height = 30 m
RBM height = 6 m
Distance = 336.8 m n=1, p =40
Elevation +
clutter height
maps with
NLOS

Link type evaluation example 2: Washington DC - Downtown
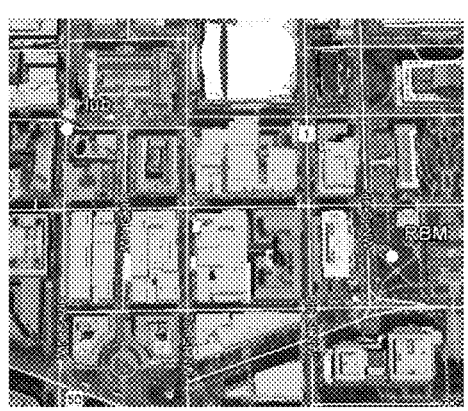
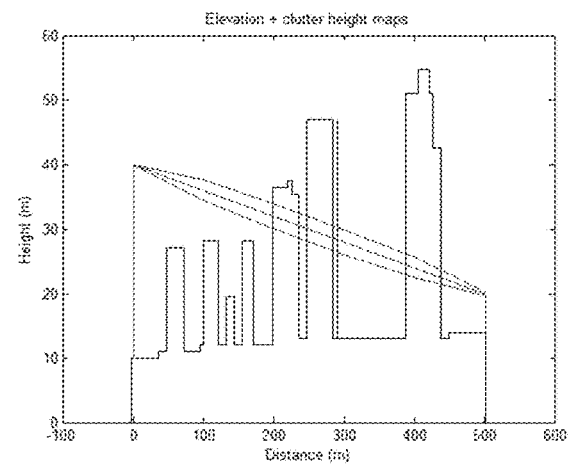
Hub height = 30 m
RBM height = 6 m
Distance = 502.3 m
n=1, p=40
NLOS
Fig. 10A
Fig. 10B 1.3 Channel Calibration

1.4 RF Environment identification

1.5 Fade margin computation $$\text{Ant}_{gain} (dB) = \text{Tx}_{gain} (dB) + \text{Rx}_{gain} (dB)$$

Example: Mean and Angle Spread of AoD

Example: Site Association

- Metric used
  - Terrain Pathloss
  - Spectral efficiency
  - CINR

Round 1

| HM1 | HM2 |
|---|---|
| RBM2 | RBM6 |

Round 2

| HM1 | HM2 |
|---|---|
| RBM2 | RBM6 |
| RBM3 | RBM4 |

Round 3

| HM1 | HM2 |
|---|---|
| RBM2 | RBM6 |
| RBM3 | RBM4 |
| RBM1 | RBM5 | best PL

| HM1 | HM2 |
|---|---|
| RBM2 | RBM6 |
| RBM3 | RBM3 |
| RBM4 | RBM4 |
| RBM1 | RBM5 |
| RBM5 | RBM1 |
| RBM6 | RBM2 | worst PL

Rank RBMs for each HM from the best to worst PL.

Example: Ottawa Downtown-Map View
Scenario: 5 Candidate Macro Sites, 24 Small Cells

Example: Ottawa Downtown-Map View
Result: Site Association

Best utility with 5 macro sites

- Macro cell site
- Small cell

| Site ID | RBM ID association |
|---|---|
| 1 | 4,5,6,9,13 |
| 2 | 1,2,3,7,8,11 |
| 3 | 10,12,14,17 |
| 4 | 16,18,21,22,23 |
| 5 | 15,19,20,24 |

Example: Ottawa Downtown-Map View
Result: Hub Clustering (Dimensioning) &
Pointing Macro cell site
Small cell

| Site ID | RBM ID association |
|---|---|
| 1 | 4,5,6,9,13 |
| 2 | 1,2,3,7,8,11 |
| 3 | 10,12,14,17 |
| 4 | 16,18,21,22,23 |
| 5 | 15,19,20,24 |

Result: Site 1
4 HMs: Serving RBMs = 4, 5, 6, 9, 13
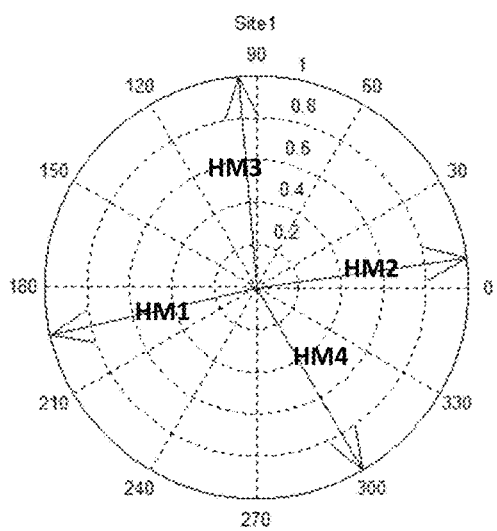
Fig. 22A
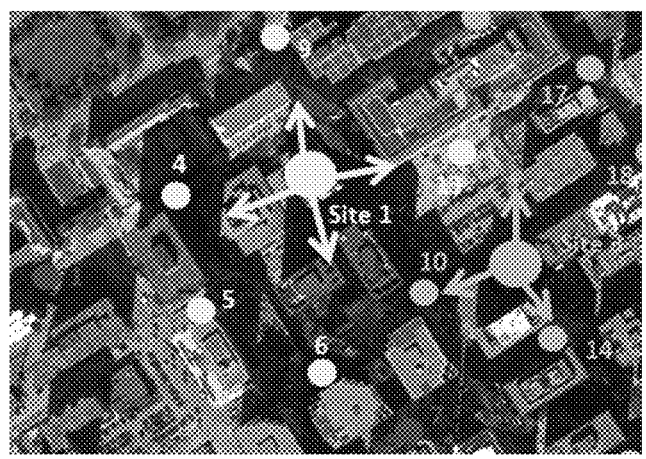
Fig. 22B
| | Pointing | Downtilt | Serving RBM IDs |
|---|---|---|---|
| HM1 | 193 | 0 | 4,5 |
| HM2 | 8 | 0 | 13 |
| HM3 | 95 | 0 | 9 |
| HM4 | 300 | 0 | 6 |
Fig. 22C

Result: Site 2
3 HMs: Serving RBMs = 1, 2, 3, 7, 8, 11
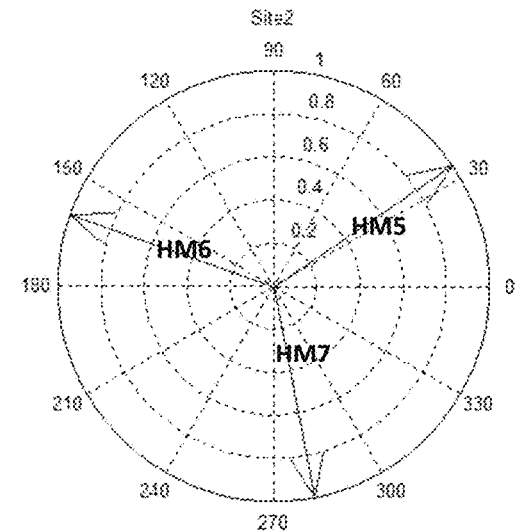
Fig. 23A
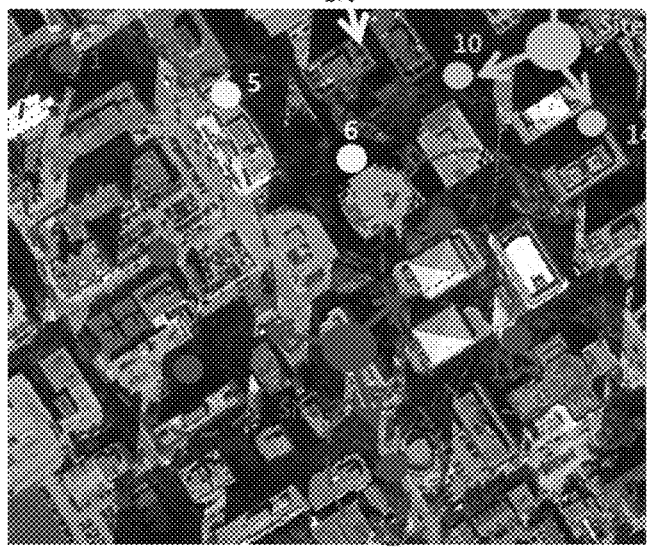
Fig. 23B
|     | Pointing | Downtilt | Serving RBM IDs |
|-----|----------|----------|-----------------|
| HM5 | 34       | 4        | 7,11            |
| HM6 | 160.5    | 4        | 1,2,3           |
| HM7 | 281      | 4        | 8               |
Fig. 23C

Result: Site 3
3 HMs: Serving RBMs = 10, 12, 14, 17
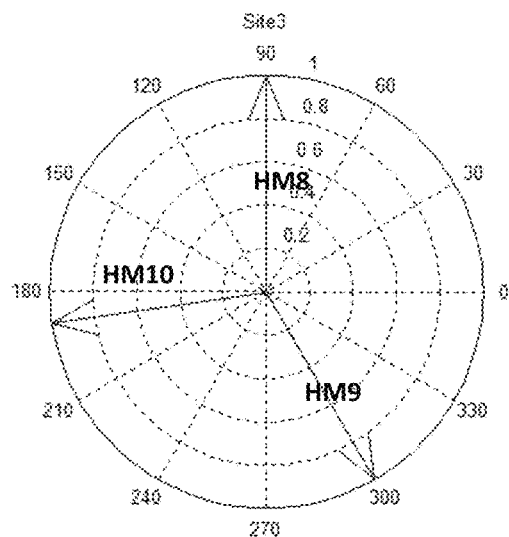
Fig. 24A
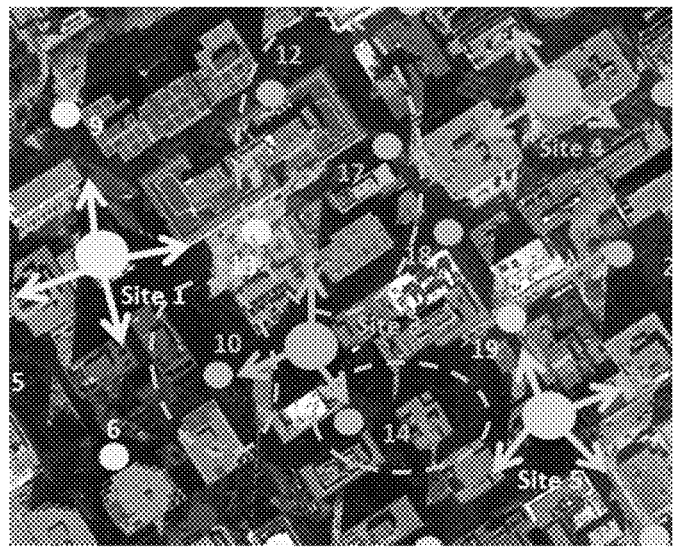
Fig. 24B
Fig. 24C
|      | Pointing | Downtilt | Serving RBM IDs |
|------|----------|----------|-----------------|
| HM8  | 90       | 4        | 12,17           |
| HM9  | 300      | 4        | 14              |
| HM10 | 188.5    | 4        | 10              |

Result: Site 4
3 HMs: Serving RBMs = 16, 18, 21, 22, 23
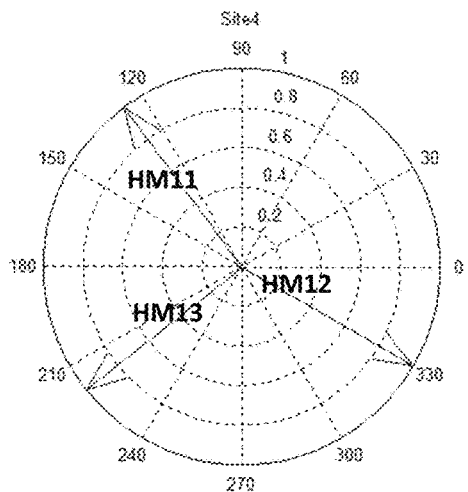
Fig. 25A
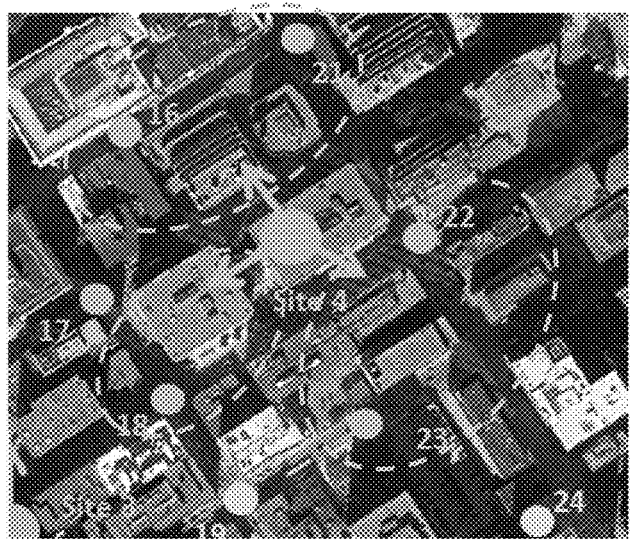
Fig. 25B
|  | Pointing | Downtilt | Serving RBM IDs |
|---|---|---|---|
| HM11 | 126.5 | 4 | 16,21 |
| HM12 | 330 | 4 | 18 |
| HM13 | 218.5 | 4 | 22,23 |
Fig. 25C

Results: Site 5
4 HMs: Serving RBMs = 15, 19, 20, 24
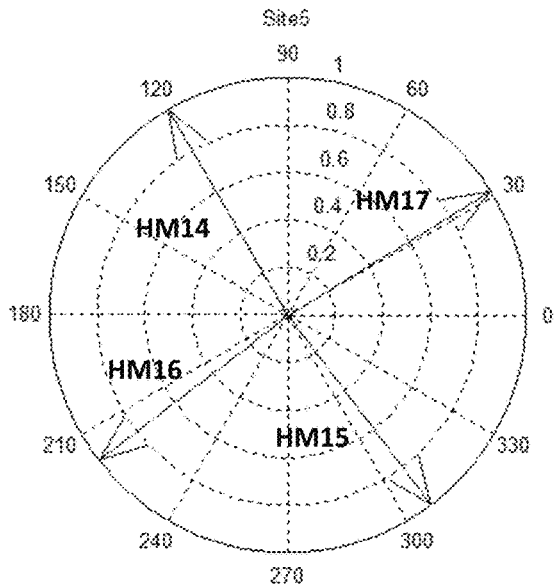
Fig. 26A
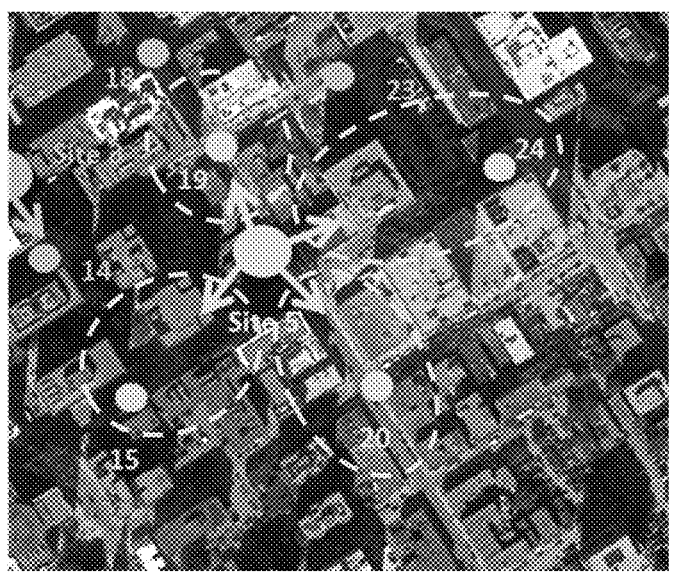
Fig. 26B
|  | Pointing | Downtilt | Serving RBM IDs |
|---|---|---|---|
| HM14 | 120 | 4 | 19 |
| HM15 | 307 | 4 | 20 |
| HM16 | 217 | 4 | 15 |
| HM17 | 31.5 | 4 | 24 |
Fig. 26C Example: Washington Downtown – Map View
Hub Deployment, Hub Pointing & RBM-to-Hub Association 2 RBMs per hub: 1 LOS and 1 NLOS

Backhaul Network Topology 1
4 Macrocell Sites (8 HMs), 16 RBMs

| Site | HM ID | HM height (m) | HM pointing (degree) | HM downtilt (degree) | Serving RBM ID |
|---|---|---|---|---|---|
| 1 | 1 | 50 | 100 | 15 | 1,2 |
| 1 | 2 | 50 | 200 | 15 | 3,4 |
| 2 | 7 | 40 | 89 | 15 | 13,14 |
| 2 | 8 | 40 | 230 | 15 | 15,16 |
| 3 | 5 | 35 | 98 | 15 | 9,10 |
| 3 | 6 | 35 | 195 | 15 | 11,12 |
| 4 | 3 | 50 | 190 | 20 | 5,6 |
| 4 | 4 | 50 | 255 | 20 | 7,8 |

2 HMs per site
2 RBMs per hub: 1 LOS and 1 NLOS

Fig. 30

Topology 1 on 5.8GHz ONLY

| RBM ID | CINR [dB] | Max Throughput [Mbps] |
|---|---|---|
| 1 | 30 | 200 |
| 2 | 3.6 | 0 |
| 3 | 9 | 42.9 |
| 4 | 22.6 | 114.3 |
| 5 | 30.7 | 200 |
| 6 | 6.5 | 28.6 |
| 7 | 31.2 | 200 |
| 8 | -3.2 | 0 |
| 9 | 31 | 200 |
| 10 | 22.3 | 114.3 |
| 11 | 24.2 | 171.4 |
| 12 | 11.6 | 57.1 |
| 13 | 31 | 200 |
| 14 | 3.5 | 0 |
| 15 | 17.4 | 114.3 |
| 16 | 18.3 | 114.3 |

6 RBMs (highlighted) do not satisfy CIR requirement:

Link budget challenged: RBM 2,3,6,8,14

Interference challenged: RBM 12

Network optimization is applied to improve the performance of link budget challenged and interference challenged RBMs

Fig. 31

| RBM ID | Busy-Time Throughput (Mbps) Baseline 5.8 GHz Only | Busy-Time Throughput (Mbps) After network Optimization |
|---|---|---|
| 1 | 100 | 200 |
| 2 via R1 | 0 | 535.71 |
| 3 | 200 | 357.14 |
| 4 | 57.1 | 114.29 |
| 5 | 278.6 | 289.29 |
| 6 | 282.1 | 401.79 |
| 7 | 278.6 | 357.14 |
| 8 via R2 | 0 | 114.29 |
| 9 | 367.9 | 535.71 |
| 10 | 57.1 | 114.29 |
| 11 | 353.6 | 535.71 |
| 12 | 28.6 | 114.29 |
| 13 | 100 | 100 |
| 14 via R3 | 0 | 100 |
| 15 | 57.1 | 100 |
| 16 | 325 | 357.14 |

| RBM-ID | Carrier assignment |
|---|---|
| 1 | 5GHz |
| 2 | 60GHz |
| 3 | 60GHz |
| 4 | 5GHz |
| 5 | 5GHz |
| 6 | 60GHz |
| 7 | 60GHz |
| 8 | 5GHz |
| 9 | 60GHz |
| 10 | 5GHz |
| 11 | 60GHz |
| 12 | 5GHz |
| 13 | 60GHz |
| 14 | 5GHz |
| 15 | 5GHz |
| 16 | 60GHz |

All RBMs satisfy CIR requirement

Fig. 32

Small Cell Deployment: Example Steps 1, 2, 3

Small Cell Deployment: Example Step 4

Small Cell Deployment: Example Step 5

METHOD AND SYSTEM FOR NETWORK PLANNING IN FIXED WIRELESS BACKHAUL NETWORKS

CROSS-REFERENCE TO RELATED APPLICATIONS

This application is related to U.S. patent application Ser. No. 14/643,022, entitled "System And Method of Signalling For Point-To-Multi-Point (PtMP) Transmission In Fixed Wireless Backhaul Networks" filed Mar. 10, 2015; U.S. patent application Ser. No. 14/215,798, entitled "System and Method for Joint Scheduling in Dual-Carrier Wireless Backhaul Networks", filed Jun. 14, 2014; U.S. patent application Ser. No. 14/255,068, entitled "System and Method for Coordinating Hub Beam Selection in Fixed Wireless Backhaul Networks", filed Apr. 17, 2014; U.S. patent application Ser. No. 14/073,459, entitled "Method and System for Performance Management in Wireless Backhaul Networks via Power Control", filed Nov. 6, 2013, claiming priority from U.S. Provisional patent application No. 61/723,494, entitled "Method and Apparatus for Inter-Cluster Power Management", filed on Nov. 7, 2012; U.S. patent application Ser. No. 14/462,859, entitled "System and Method for Self-Optimized Uplink Power Control in a Fixed Wireless Backhaul Network", filed Aug. 19, 2014; U.S. patent application Ser. No. 14/462,912, entitled "System and Method for Downlink Power Optimization in a Partitioned Wireless Backhaul Network with Out-of-Neighborhood Utility Evaluation", filed Aug. 19, 2014; each of these applications is incorporated herein by reference in its entirety.

TECHNICAL FIELD

The present invention relates generally to telecommunications service network technology for wireless backhaul, and particularly to network planning for fixed wireless backhaul networks comprising terrain path loss and antenna gain prediction; site association, hub dimensioning, pointing and clustering; and optimization of small cell deployment.

BACKGROUND

Wireless backhaul networks are deployed to carry the traffic between a wireless access network and the core network. For example, a wireless backhaul network may comprise a plurality of hubs, each connected to the wired core network, via Ethernet. Each hub serves multiple remote backhaul modules (RBMs), in a point-to-multipoint (PtMP) or point-to-point (PtP) configuration, using a wireless channel. Each RBM is deployed close to an access network base station, such as a small cell base station, and connected to the base station via a cable. The hubs are deployed at the locations where wired high capacity access to the core network is available, e.g. at a fiber point-of-presence.

Network planning in wireless backhaul networks is important for operators to effectively plan, scale and optimize operation of their wireless backhaul network and, in most cases, to complement operation of their wireless access networks. For example, given potential hub sites and RBM sites, it must be determined where to deploy hubs, how many hubs are to be deployed, and where those hubs should point to.

Network planning includes, e.g., prediction of pathloss for each link of the network, foreign interference detection, backhaul network deployment algorithm design, and small cell optimization. Terrain pathloss (PL) prediction usually required detailed knowledge of the terrain, including high resolution digital maps with topographical details, and information about buildings and other "clutter", such as, trees and bridges, that may block or interfere with line-of-sight (LOS) communications. In urban areas, information on buildings and other structures must be obtained, e.g. from building polygons.

Commercially available RF planning tools are generally slow in nature, require significant data inputs, and do not provide real-time performance results. There is a need for systems and methods that can predict terrain pathloss (PL) for fixed backhaul networks, pre-deployment, and given limited sets of inputs, for example, for locations where there are no available high-resolution digital maps, no available building polygons, et al.

There is also a need for systems and methods that can more effectively predict foreign interference. Typically each network operator performs network planning independently of operators of neighboring networks, i.e. other backhaul networks and/or access networks. Accordingly, there is also a need for deployment algorithms to consider foreign interference, and/or that enable operators to optimize performance relative to neighboring networks.

The end user quality of experience (QoE) is a function of both backhaul link performance and access link performance. Thus, there is a need for network planning systems and methods that consider performance of both backhaul network small cells (SC) and access link performance, so as to optimize end-to-end throughput and performance of each end-to-end link in the network.

An object of the present invention is to provide an improved or alternative method and system for network planning wireless backhaul networks, and particularly for wireless backhaul networks comprising fixed or stationary nodes with directional antennas, including small cell non-line-of-sight (NLOS) backhaul networks.

SUMMARY OF INVENTION

The present invention seeks to eliminate, or at least mitigate, disadvantages of known systems and methods, or at least provide an alternative.

Aspects of the invention provide systems and methods for network planning in fixed wireless backhaul networks comprising one or more of terrain pathloss (PL) and antenna gain prediction; network design comprising site association, hub dimensioning and pointing; and optimization of small cell deployment, wherein PL prediction comprises selecting one of a set of reference use case channel models for each of downtown, urban, suburban and use case or environment scenarios, and performing PL prediction and other network planning steps based on the selected use case channel mode.

One aspect of the invention provides a method for network planning for a fixed wireless backhaul network comprising a plurality of nodes, wherein each node comprises at least one hub module (HM) at each macro-cell site, and each hub module serves a set of remote backhaul modules (RBMs) through hub-RBM radio links, each RBM being located at a small cell (SC) site, and wherein the method comprises one or more of:
a) terrain pathloss (PL) and antenna gain prediction;
b) network design and system design comprising site association, hub dimensioning and pointing; and
c) optimization of small cell deployment; and
and wherein performing Terrain PL prediction comprises selecting one of a set of reference use cases comprising channel models for each of downtown, urban and suburban use case scenarios, and performing PL prediction and other network planning steps based on user input, and estimated inputs for other parameters based on the selected channel model.

The Terrain PL for each link is predicted as the sum of: a term based on the use-case model and a LOS (line-of-sight) link type or NLOS (non-line-of-sight) link type, a calibration term based on channel calibration and an additional loss term based on a RF environment identification and optionally, the PL term additionally comprises a fade margin based on the RF environment identification and a reliability target.

Thus beneficially network planning for backhaul networks can be done rapidly and effectively with limited input data, even in the absence high resolution digital maps or building polygons, by modelling a proposed wireless backhaul network using channel models having a highest correlation with available environmental parameters, e.g. information from elevation maps (e.g. elevation relative to sea level), average building heights, street widths and layout.

Another aspect of the invention provides a method for network planning in a fixed wireless backhaul network comprising a plurality of nodes, wherein each node comprises at least one hub module (HM) at each macro-cell site, and each hub module serves a set of remote backhaul modules (RBMs) through hub-RBM radio links, each RBM being located at a small cell (SC) site, and wherein the method comprises terrain pathloss (PL) prediction comprising steps of:

providing a reference set of use cases, each use case comprising a channel model for one of a plurality of deployment scenarios for downtown, urban and suburban use cases;
obtaining user input parameters relating to an actual deployment scenario to be planned; finding a correlation between said user input parameters and parameters of one or more of the use cases of the reference set of use cases;
based on said correlation, selecting a most appropriate one of the reference set of use cases, and obtaining therefrom further parameters for the respective channel model for the selected use case;
obtaining user inputs comprising HM and RBM locations, an elevation map and clutter height map;
performing a link type determination to identify LOS and NLOS link types for each feasible HM-RBM link; and calculating a terrain PL for each HM-RBM link based on the further parameters for the respective channel model for the selected use case and the link type determination,
wherein the terrain PL for each HM RBM link comprises a predicted PL based on the respective channel model and link type determination.

The method may further comprise one or more of channel calibration, RF environment identification and fade margin computation, and wherein Terrain PL for each HM-RBM link comprises the predicted PL based on the use-case model and link type and on one or more of a channel calibration term, an additional loss term based on an RF environment identification, and a fade margin.

Performing a link type determination may further comprise outputting for each link a LOS link or NLOS link condition and point-to-point link profile plot for each link. The link type determination may comprise link type determination based on a Fresnel zone (n, p) where n is the order of a Fresnel zone and p is the obstruction allowance.

Obtaining user input data may further comprise obtaining parameters from survey data.

The method may further comprise performing channel calibration comprising calibrating statistical models to pathloss vs. distance with one or more of RF planning predictions and field measurements for the selected reference use case. Channel calibration may comprise, for each distance d, computing the PL difference between a predicted curve and each statistical model (delta PL); and finding a curve that fits this delta PL curve against distance such that the mean PL error is zero. Curve smoothing may be applied to predicted data and then curve fitting is based on a linear curve and/or based on a higher order polynomial curve.

The method may further comprise RF environment identification comprising, based on user input data from one or more of clutter maps, polygon maps and ray-tracing, determining an RF environment from one of a set of available RF environment models comprising one or more of: LOS+reflection; LOS+scattering; NLOS+reflection; NLOS+diffraction; NLOS+canyon; and other applicable models.

The method may comprise, after the step of RF environment identification, performing fade margin computation comprising:
obtaining a cumulative distribution function CDF of a target metric;
obtaining a median value $X_m$ of the metric from the CDF curve $X_m$;
locating a target value $X_{target}$ of the metric on the CDF curve;
computing a fade margin (dB)=$X_m$-$X_{target}$.

Performing antenna gain prediction may comprise:
obtaining inputs comprising:
  HM coordinates of each HM
  RBM coordinates of each RBM
  a channel model for the selected use case;
  a respective link type of each link;
generating a power delay profile (PDP);
optionally, obtaining AoD and AoA values;
obtaining a HM and RBM pointing and antenna pattern and performing 3D antenna interpolation;
calculating RX and TX gains for each HM-RBM link.

Obtaining AoD and AoA values may comprise computing AoD and AoA values based on a 3D double bounce model.

Yet another aspect of the invention provides a method for network planning in a fixed wireless backhaul network comprising a plurality of nodes, wherein each node comprises at least one hub module (HM) at each macro-cell site, and each hub module serves a set of remote backhaul modules (RBMs) through hub-RBM radio links, each RBM being located at a small cell (SC) site, and wherein the method comprises:
determining a network topology for backhaul links wherein the network topology comprises one or more of a single-hop and a multi-hop topology by steps comprising:
  a) obtaining user inputs comprising: coordinates of each HM and RBM; pathloss (PL) values for each hub-RBM link, per carrier, and per hub beam; a selected utility function;
  b) performing RBM to HM site association based on a selected metric comprising one of Terrain PL, spectral efficiency or CINR, for each Hub RBM link, to provide a RBM-site association for possible candidate site combinations;
  c) performing for each HM site and its served RBMs:
    joint hub pointing; hub deployment (hub dimensioning=number of hubs); hub association; RBM pointing; comprising sweeping all parameters (feature options) to maximize the utility function;
  d) generating output comprising: a number of macro-cell sites to deploy; a number of hubs to deploy for each macro-cell site; clustering comprising hub-RBM associations; pointing comprising hub pointing and tilting;

e) evaluating a predicted performance metric of each hub-RBM link based on said outputs; and if required, repeating steps b) to e) until a selected performance metric is met.

The performance metric may comprise target throughput requirements. The method may further comprise selecting an interference management scheme comprising one or more of: dual carrier assignment; channel assignment-frequency reuse; and power control; to meet target throughput requirements for each hub-RBM link.

A further aspect of the invention provides a method for network planning in a fixed wireless backhaul network comprising a plurality of nodes, wherein each node comprises at least one hub module (HM) at each macro-cell site, and each hub module serves a set of remote backhaul modules (RBMs) through hub-RBM radio links, each RBM being located at a small cell (SC) site, and wherein the method comprises optimization of small cell deployment by jointly considering the end-to end performance of both access links and backhaul links, by steps comprising:
selecting a performance metric (utility function) to be optimized obtaining input data defining the network topology comprising:
a set of feasible SC site locations; and
PL information for each site to each RBM for each carrier and each hub beam;
performing access link evaluation comprising:
dividing a network area into a plurality of candidate regions for a test user equipment (UE) dropped in each candidate region, computing throughput for an access link between the UE and for each feasible SC site location to obtain an access link evaluation;
obtaining a traffic load evaluation comprising obtaining an estimation of the amount of user traffic in a candidate region;
performing backhaul link evaluation comprising:
for a test SC placed at each feasible SC site location, computing a backhaul throughput wherein computing backhaul throughput comprises performing one or more of: Hub association, Hub pointing. RBM pointing. Hub beam selection and RBM beam selection;
computing a metric using said utility function for each feasible SC candidate location, and selecting a new SC location that maximizes the metric;
outputting the new SC location and performing a topology update with the newly added SC:
evaluating whether a desired target value of the metric is met, and if not, repeating the above steps until a desired target value of the metric is met.

The utility function may be selected to optimize capacity and/or coverage.

Obtaining input data may further comprise obtaining one or more of RBM QoS requirements and ray tracing information.

Further aspects of the invention provide a system for implementing methods disclosed herein. Also provided is a computer readable storage medium storing reported data and storing programming instructions for execution by one or more processing units of the system, said programming instructions implementing, in one or more of said processing units, a method as described herein.

Advantageously, methods and systems according to exemplary embodiments of the invention provide for fast backhaul network planning, even when user inputs are limited, e.g. in the absence of high resolution digital maps, building polygons, et al.

Thus, improved or alternative systems and methods are provided network planning in a wireless backhaul network is provided, with particular application for wireless backhaul networks comprising fixed or stationary nodes with directional antennas, including small cell non-line-of-sight (NLOS) backhaul networks.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF THE DRAWINGS

FIGS. 10A and 10B shows an example of link type determination for a second example based on a downtown area of Washington, D.C.;

FIGS. 22A, 22B, and 22C illustrate schematically results for site 1, with four hub modules (HM) serving five RBMs, showing respectively in FIG. 22A, a hub pointing diagram; in FIG. 22B, a map view showing site association of the five RBMs to the hub modules of site 1; and in FIG. 22C, a table showing hub pointing, downtilt and serving RBM IDs. steps of a method for network planning in a wireless backhaul network for an example for a downtown area of the city of Ottawa;

FIGS. 23A, 23B, and 23C illustrate schematically results for site 2, with three hub modules (HM) serving six RBMs;

FIGS. 24A, 24B, and 24C illustrate schematically results for site 3, with three hub modules (HM) serving four RBMs;

FIGS. 25A, 25B, and 25C illustrate schematically results for site 4, with three hub modules (HM) serving five RBMs;

FIGS. 26A, 26B, and 26C illustrate schematically results for site 5, with four hub modules (HM) serving four RBMs;

FIG. 30 shows a table of results for Backhaul Network Topology 1 with 4 macro cell sites and 16 RBMs;

FIG. 31 shows performance evaluation results for Topology 1 on 5.8 GHz only;

FIG. 32 shows performance evaluation results for Topology 2;

DESCRIPTION OF EMBODIMENTS

A system and method for network planning a wireless backhaul network according to an embodiment of the present invention will be described, by way of example, with reference to a NLOS wireless backhaul network 100 as illustrated schematically in FIG. 1, which represents schematically the topology of a system comprising a point-to-point wireless backhaul network, comprising a plurality of fixed nodes. The nodes comprise a plurality of hubs 102 and RBMs 104.

Figure 1:
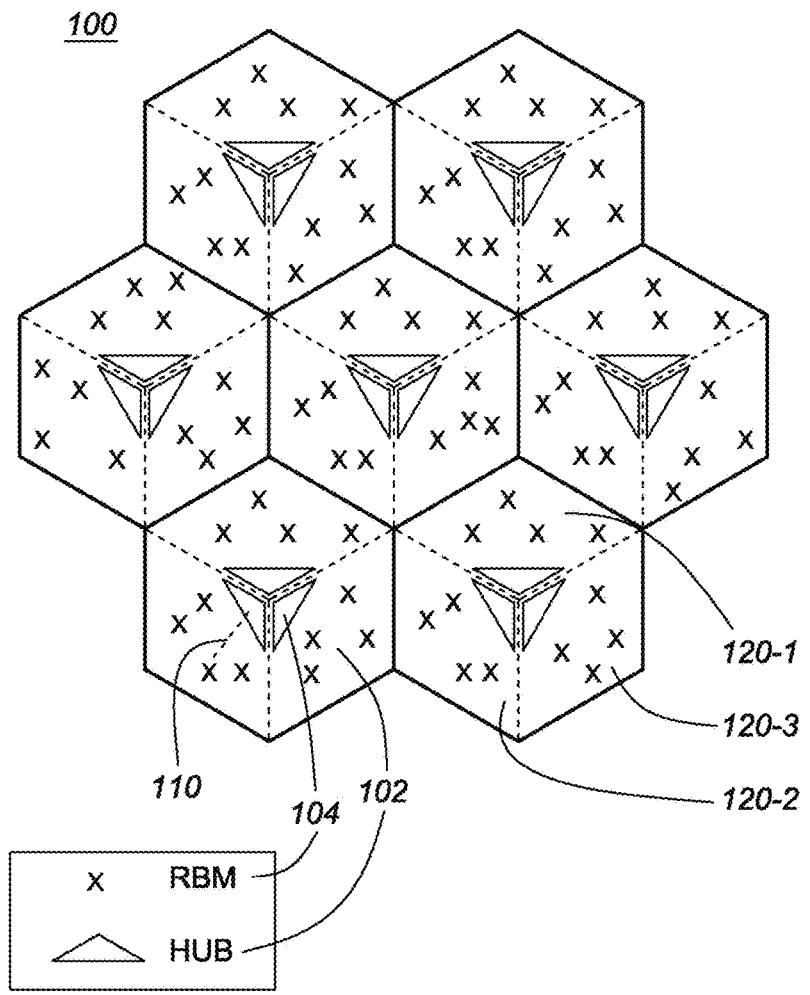
FIG. 1 shows a schematic diagram representing the topology of a wireless backhaul network comprising a plurality of hubs, each hub serving a plurality of Remote Backhaul Modules (RBMs) to illustrate a method of network planning for fixed wireless backhaul networks according to an embodiment of the present invention.

As an example only, the wireless backhaul network 100 shown in FIG. 1 comprises a plurality of seven sites or cells, each site comprising three hub modules 102, with each hub module serving a sector 120 comprising a cluster of a plurality of Remote Backhaul Modules (RBMs) 104. Thus, there are 21 sectors, each with a hub module 102, serving a cluster of up to four RBMs. As shown, three hubs modules 102, each with directional antenna, are co-located in each of the cell centers, with a cluster of RBMs mapped to each respective serving hub module in each of the three sectors 120-1, 120-2 and 120-3 of the cell.

Figure 2:
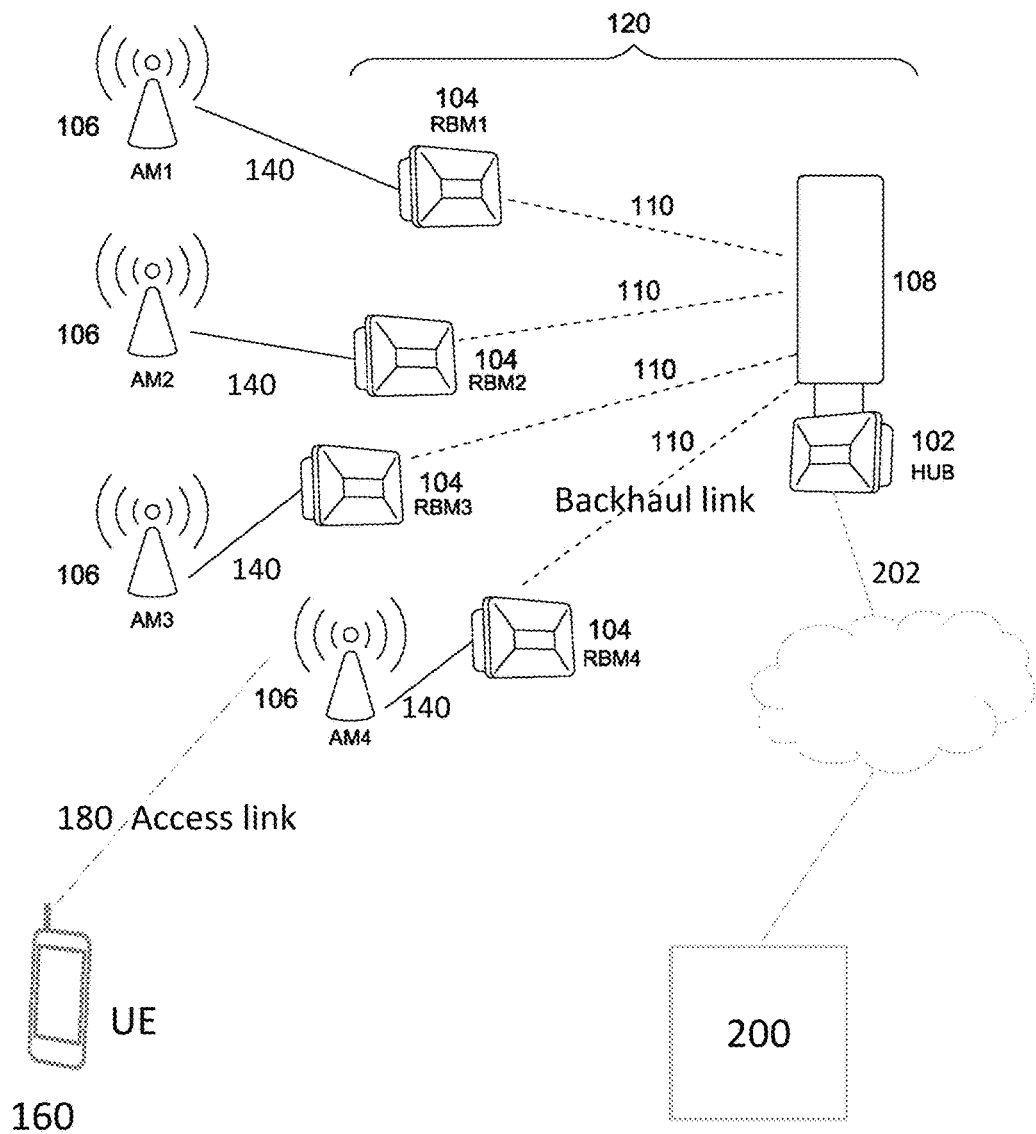
FIG. 2 shows a schematic diagram of representing the architecture of part of the wireless backhaul network of FIG. 1, comprising one cluster of four RBMs served by a hub module (HM), each RBM being connected to an access module (AM), i.e. a small cell or access link base station, of an access network, and wherein the hub has a connection to a centralized control server.

In each sector 120, a hub 102 serves its set or cluster of Remote Backhaul Modules (RBMs) 104 through wireless links, i.e. hub-RBM radio links 110, as shown schematically in FIG. 2. Each RBM 104 communicates with and is co-located with an access module (AM) 108 of an access network, such as a small cell-base station, using a wired connection, e.g. an Ethernet cable. The hub module 102 may have a multi-beam antenna 108 and RBMs 104 each have an integrated directional antenna that is directed towards the hub. Unlike a multi-hop architecture, each link 110 comprises only one hop from each RBM 104 to a respective hub to carry the traffic. It is also different from the relay system where the access links and relay links share the same radio frequency band. The backhaul network operates at a different frequency band from that of the access network. Also shown in FIG. 2 is a communications link 202 from the hub 102 to a centralized server or controller 200, for managing control functions of the wireless backhaul network.

In general, a wireless backhaul network topology may be more complex and diverse that the simplified representation shown in FIG. 1. As will be appreciated, in urban areas, feasible locations for placement of hub modules above the clutter may be limited. Also feasible locations, such as utility poles, for placement of RBMs may be limited. In dense urban areas, large buildings and other structures significantly affect the RF environment, causing reflections, scattering or refraction, and reducing the number of possible LOS links relative to NLOS links. More generally, a fixed wireless backhaul network may be described as comprising a plurality of macro cell sites and small cell sites. Each macro-cell site comprises one or more hub modules. Each hub module may point in different directions and serve differing numbers of RBMs, through LOS or NLOS radio links. For example, some macro cell sites comprise 4 hub modules, each pointing in different directions, and serving differing numbers of RBMs, using various hub beam pointing and downtilt configurations. In other macro-cell sites, there may be only one hub module, which serves only one or two RBMs.

Figure 3:
FIG. 3 shows a schematic diagram showing an example of geographic locations of hub modules and RBMs on a map showing streets and buildings of a downtown or city centre area.

As an example, a map view of a downtown deployment of part of a fixed wireless backhaul network comprising a plurality of hub modules and RBMs is shown in FIG. 3, to illustrate that while RBM 10 is close to a hub module at site 1, a large building blocks the path between site 1 and RBM 10 and thus RBM 10 is served by a hub module at site 3, which also serves a more distant RBM 12.

Pre-deployment network planning for a fixed wireless backhaul network according to embodiments of the invention disclosed herein comprises three elements (stages):
  Pathloss prediction comprising Terrain Pathloss (PL) prediction and antenna gain prediction;
  Backhaul network and system design; and
  Small cell deployment optimization.

Each of these stages may be carried out independently. However, beneficially, all stages are carried out sequentially during network planning, in the pre-deployment phase, with a view to optimizing the overall end-to-end user QoS.

Terrain Pathloss (PL) and Antenna Gain Prediction

Initial steps in network planning comprise Terrain PL Prediction and Antenna Gain prediction. Terrain PL prediction is important for determining:

Network design: how many hubs and RBMs are needed and where to deploy them;

RF planning: how many carrier frequencies and channels are needed; and

System design: which interference management schemes should be used.

A subsequent step in network planning is antenna gain prediction.

1.0 Terrain PL Prediction Workflow

Figure 4:
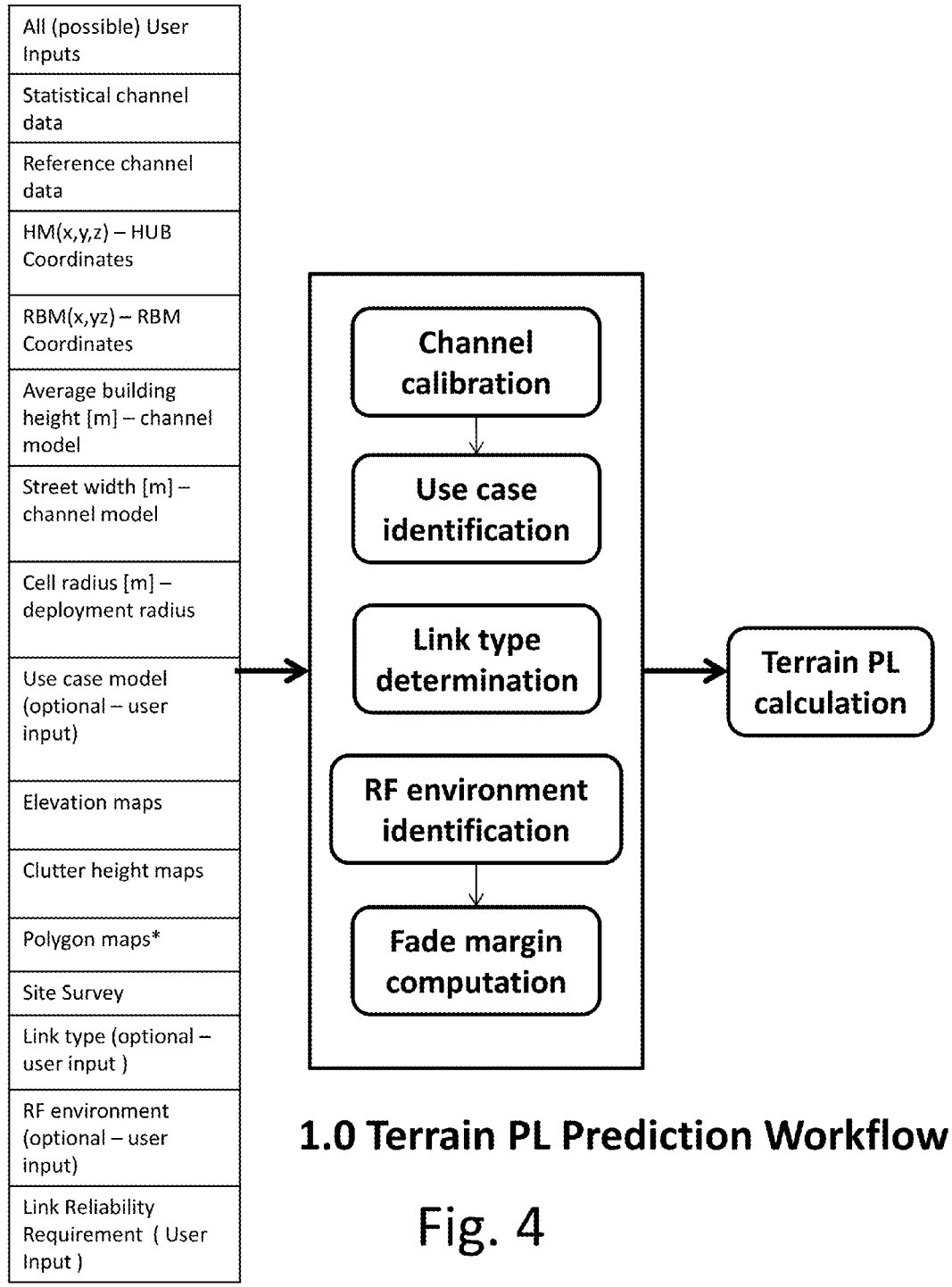
FIG. 4 shows a flowchart illustrating the workflow for a method for terrain pathloss (PL) prediction and antenna gains prediction for fixed wireless backhaul network planning, according to an embodiment of the present invention.

PL Prediction for network planning according to an embodiment of the present invention comprises the steps illustrated schematically in FIG. 4. After obtaining the required user inputs, these steps comprise:

1.1 Use Case Identification

Considering parameters of the deployment environment, such as average building height, street width, etc., determine a use case model by determining a correlation between the parameters and a set of available use case models;

1.2 Link Type Determination:

For each link, determine whether the link has a NLOS link type or a LOS link type based on a selected metric, such as the 1st Fresnel zone, and using clutter height maps.

Select a correct PL equation from a corresponding channel model given a user case 1.3 Channel Calibration:

Calibrate the channel model specific to our systems

Add a calibration term to the PL computed from equations 1.4 RF Environment Identification:

Identify an RF environment based on maps

Allow user to evaluate additional loss or gain in the total PL

Help determine the fade margin 1.5 Fade Margin Computation

Determine the fade margin due to the identified RF environment based on lookup tables 1.6 Terrain PL Computation After computation of these parameters, the Terrain PL is determined by:

Terrain PL=PL (use case model,link type)+calibration term+additional loss due to RF environment+fade margin.

User inputs for Determination of Terrain PL

User inputs include statistical channel data and reference channel data for channel calibration; coordinates of each candidate Hub location and coordinates of each candidate RBM location; data for use case model identification comprising average building height, street width; cell radius. Optional data for use case model identification may include elevation maps, clutter height maps, polygon maps and site survey data if these are available. Other use inputs may include a link type, an RF environment identifier, and a link reliability requirement.

User Inputs for Use Case Identification

Figure 5A:
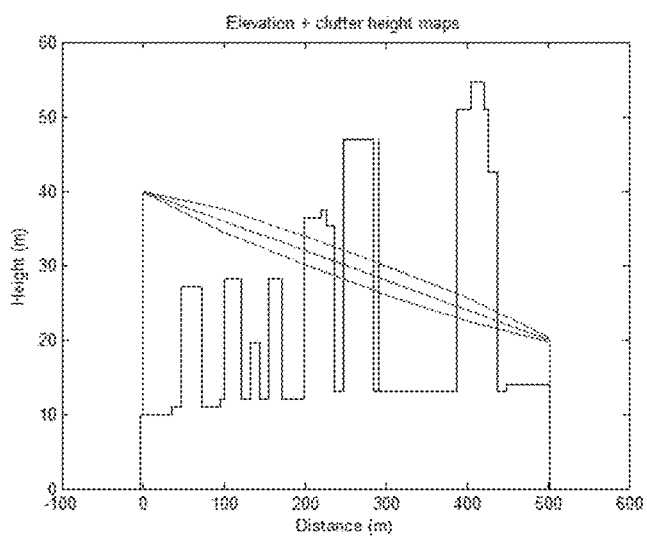
FIGS. 5A, 5B, and 5C shows examples of elevation maps for determining reference use case scenarios for reference channel models for wireless backhaul network planning in typical downtown, urban and suburban environments, according to an embodiment of the present invention.
Figure 5B:
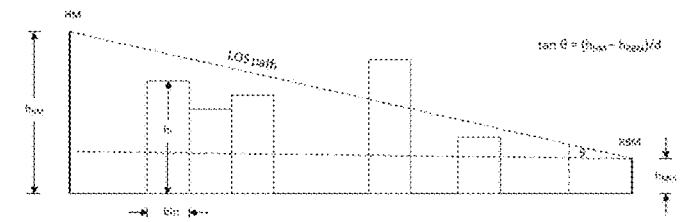
Figure 5C:
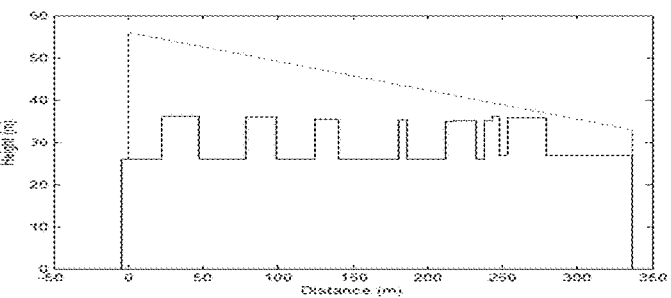

Conventional known methods for network planning required detailed knowledge of the terrain of a specific location where the network is to be deployed. Such information is typically obtained from high resolution digital maps, building polygons, and/or requires time-consuming and expensive on-site surveys. Where this information is not available, methods according to embodiments of the present invention make use of one of a limited set of reference use cases models. Each use case model (use case) is developed to facilitate rapid PL prediction based on limited user inputs. These are tuned channel models that represent each of a set of reference use cases. For example they may include a set of reference use case models that are developed to represent a typical Urban, Downtown or Suburban terrain, based on elevation and clutter height maps, and other available parameters such as street widths, based on environments and terrains in some reference cities or towns, as represented schematically in FIGS. 5A to 5C.

As an example, a reference set may comprise a number of use case channel model options such as downtown channel models, urban channel models, and suburban channel models. For example, if information is available for parameters, such as average building height, street width, et al., a correlation of these parameters is be made with one or more existing use case models and a suitable use case model is selected as a basis for a channel model that is tuned for a specific reference environment.

Link Type Determination

Figure 6:
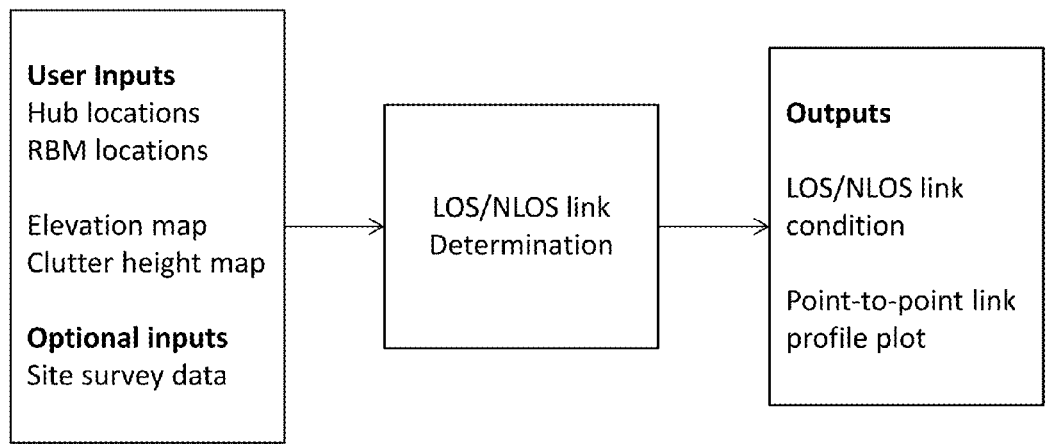
FIG. 6 shows a flowchart illustrating the user inputs and workflow for link type determination.

Referring to FIG. 6, user inputs are obtained comprising Hub and RBM locations. Parameters are also obtained based on an elevation map, i.e. the height of ground above sea level, and a clutter height map, i.e. heights of buildings, bridges, trees or other clutter above the ground. Optionally, other user input, e.g. from a site survey, may be used, if available. The link type, i.e. a NLOS link type or a LOS link type, is then determined as illustrated in FIGS. 7A and 7B.

Figures 7A, 7B:
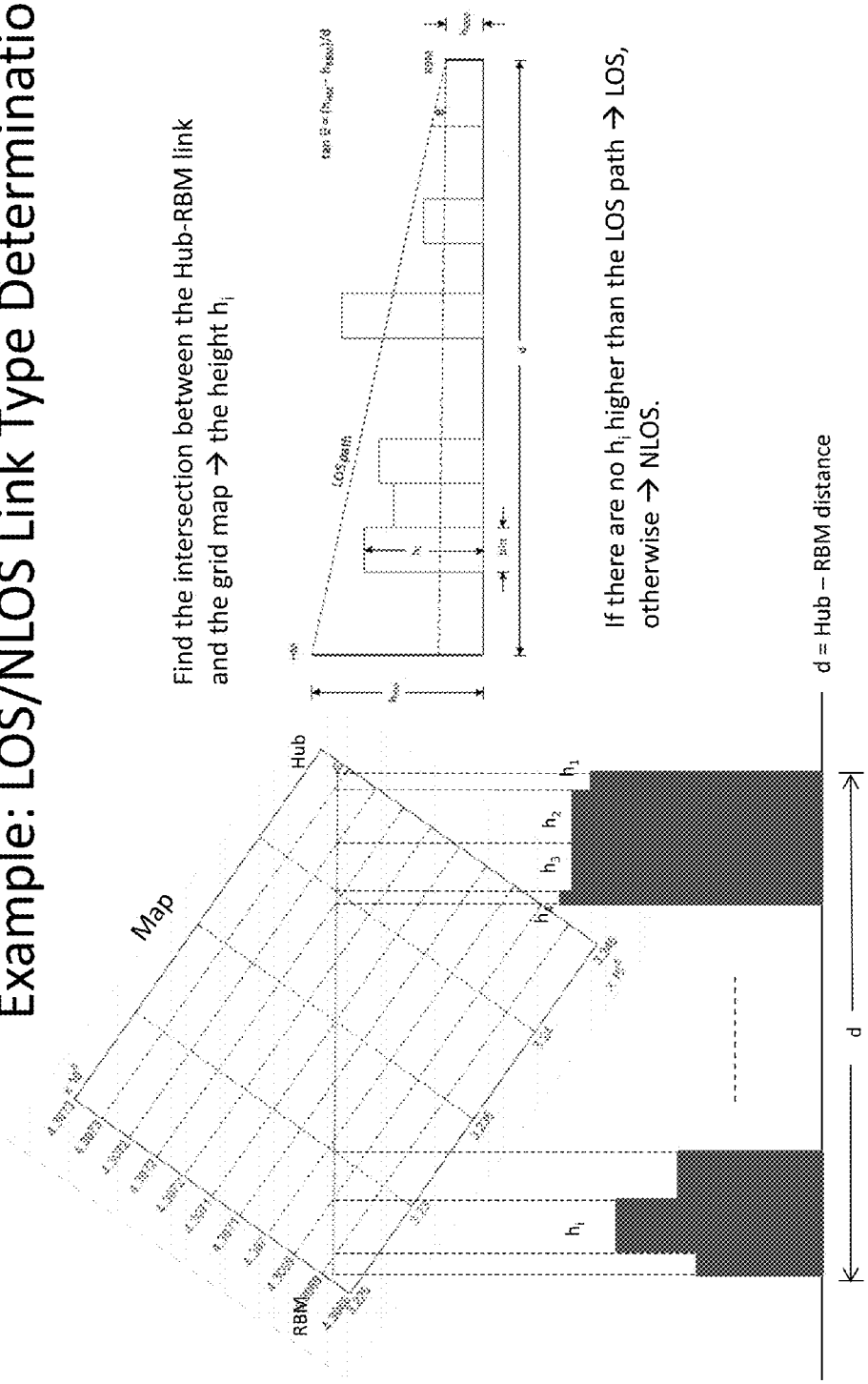
FIGS. 7A and 7B illustrate schematically the method of link type determination for LOS and NLOS link types.

FIGS. 7A and 7B represent schematically how a clutter height map can be used to find the intersection between a Hub-RBM link and the grid map and heights $h_i$. If there is no $h_i$ higher than the LOS path, the link type is LOS, and otherwise the link type is NLOS.

Figure 8A:
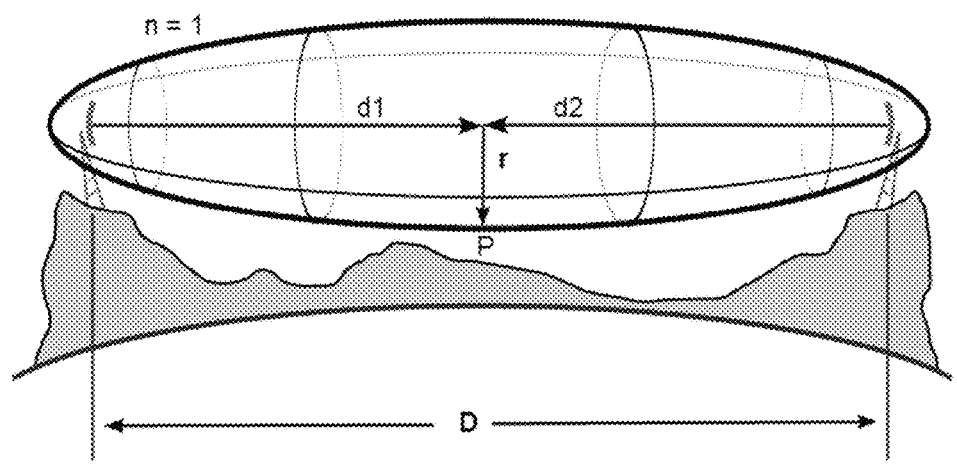
FIGS. 8A and 8B illustrate schematically parameters for link type determination based on a Fresnel zone.
Figure 8B:
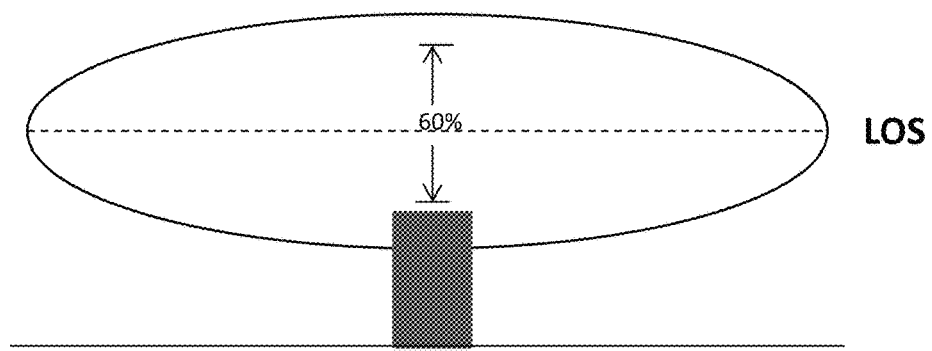
Figure 9A:
FIGS. 9A to 9D show an example of link type determination for a first example based on an urban area of Washington, D.C.
Figure 9B:
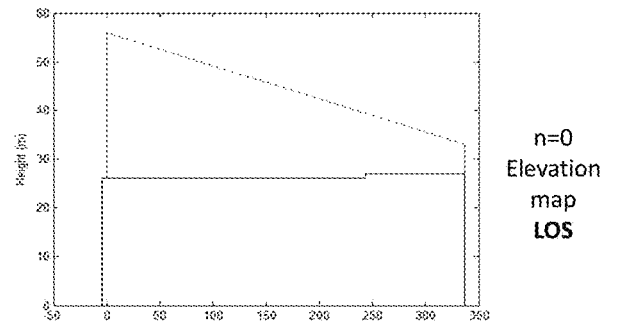
Figure 9C:
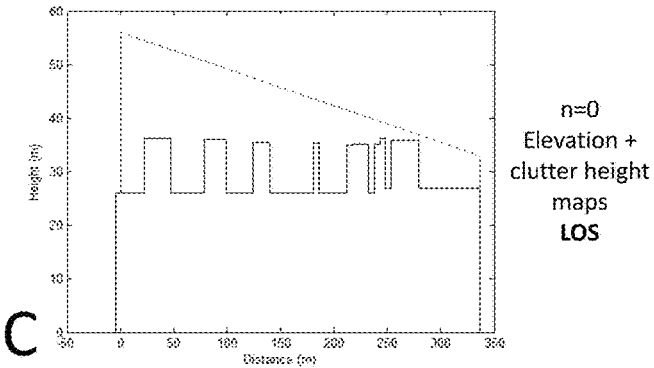
Figure 9D:
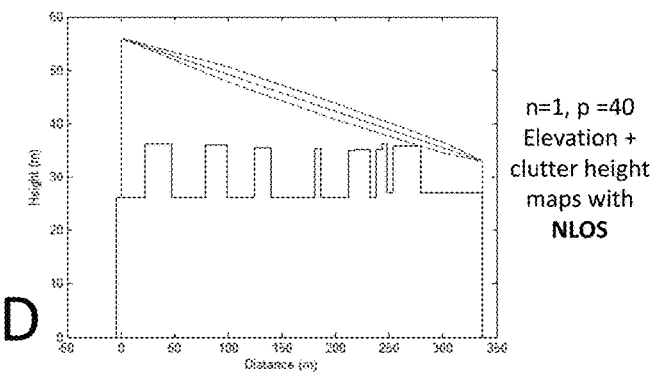

The link type may be based on a Fresnel zone. That is referring to FIGS. 8A and 8B, a link type is characterized by (n, p), where n is the order of a Fresnel zone and p is the obstruction allowance p. The radius of the n-th Fresnel zone is $$r_n = \sqrt{\frac{n\lambda d_1 d_2}{d_1 + d_2}}$$

where:

$\lambda$=wavelength in m; $d_1$=the distance (m) from hub to P;

$d_2$=the distance (m) from P to RBM;

n=1→the first Fresnel zone;

p % obstruction allowance=the maximum obstruction that can be allowed in the Fresnel zone beam.

As examples of determination of NLOS and LOS link types, FIGS. 9A to 9D show an example for Washington D.C.—Urban and FIGS. 10A and 10B show an example for Washington D.C.—Downtown.

Channel Calibration

The statistical models for each use case are calibrated with RF planning predictions and/or field measurements.

The methodology comprises:

For each distance d, compute the PL difference between 2 curves

Find a curve that fits this delta PL curve against distance such that the mean PL error is zero.

Optionally, curve smoothing is applied by removing outliners. Curve fitting may, for example, be based on a linear curve, or, based on curve fitting based on a higher-order polynomial curve.

The path loss prediction from a RF planning tool is used to calibrate the path loss as a function of distance for each use case, e.g., downtown use case model. In this example, the path loss prediction is based on Ottawa map where we consider LOS and NLOS link types. Based on the PL differences, a calibration term is determined for each link type (e.g., LOS type, NLOS type) in each use case: then $$PL_{cal}=PL+\text{calibration term}$$

Figure 11A:
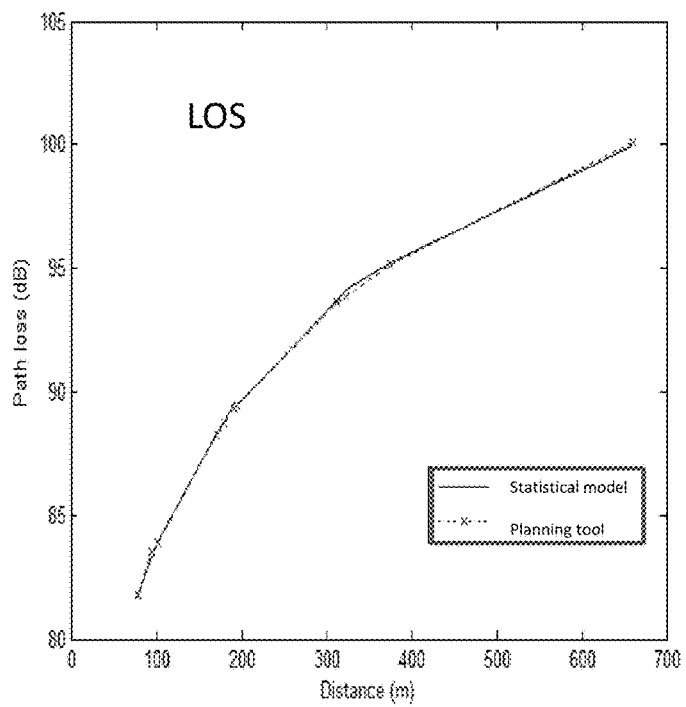
FIGS. 11A and 11B show, respectively, plots of pathloss vs. distance for examples of determination of a channel calibration term for LOS and NLOS link types.
Figure 11B:
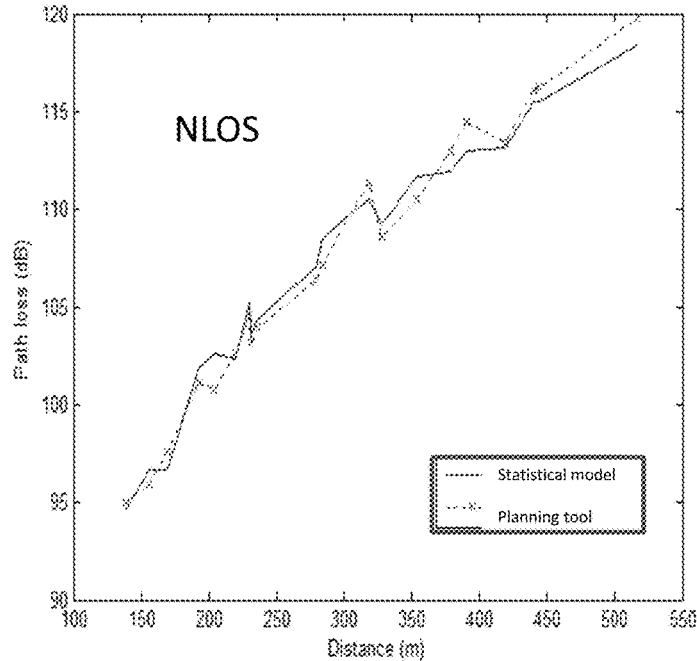

Examples are shown in FIG. 11A for a LOS link type and FIG. 11B for a NLOS link type.

Since the channel calibration depends on the accuracy of the results from the planning tools and/or field measurements, the error margin of a calibrated channel model would be at best the same as the error margin of the predicted results and/or field measurements.

RF Environment Identification

Figure 12A:
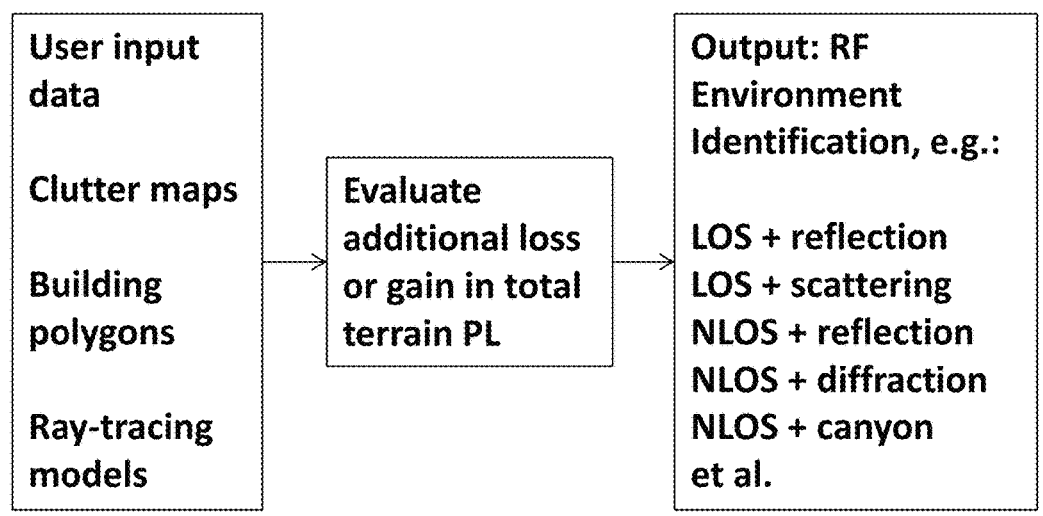
FIG. 12A shows a flowchart illustrating the user inputs and workflow for RF Environment identification.

An RF environment is identified based on maps, such as clutter maps, polygon maps and ray-tracing models, to allow the user to evaluate additional loss or gain in the total terrain PL and to assist in determining fade margins. Referring to FIG. 12A, the output from the RF environment identification is one of a set of identifications, such as, LOS+reflection,
LOS+scattering,
NLOS+reflection,
NLOS+diffraction,
NLOS+canyon,
or another RF environment identification.

Fade Margin Computation

Figure 12B:
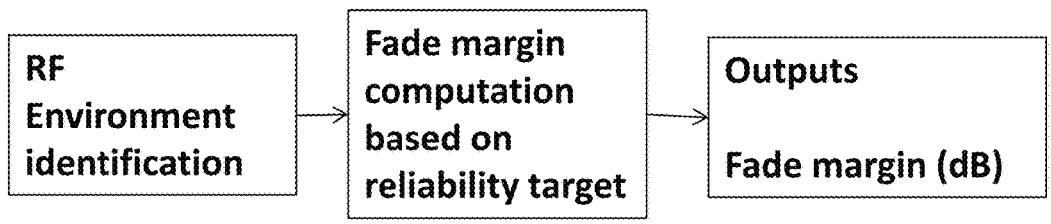
FIG. 12B shows a flowchart illustrating the user inputs and workflow for fade margin computation.
Figure 13:
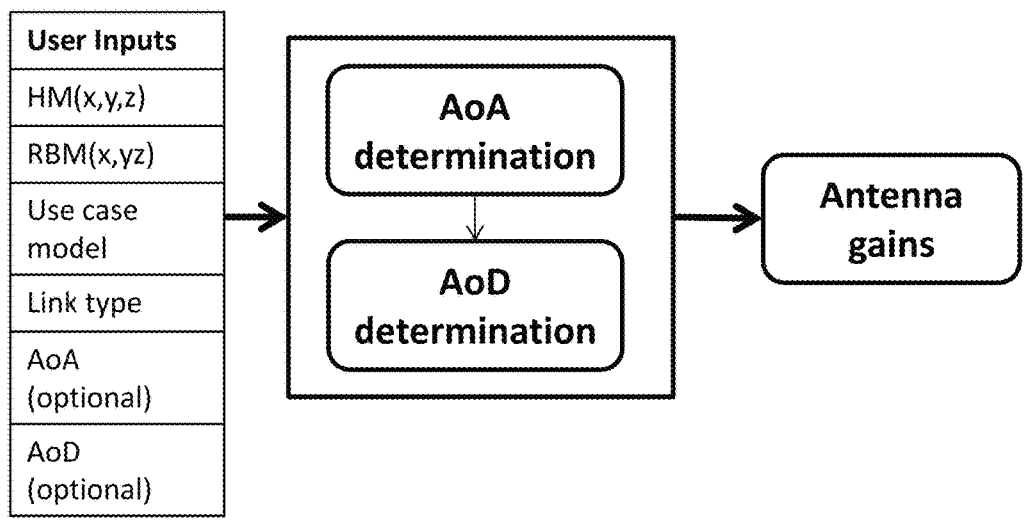
FIG. 13 shows a flowchart illustrating the user inputs and workflow for antenna gain prediction.

Referring to FIG. 12B, the fade margin of a link is computed given a reliability target (e.g., 99%) The fade margin due to the identified RF environment is based on lookup tables.

Methodology

Given an RF environment, based on outdoor testing data, obtain a Cumulative Distribution Function (CDF) of a metric (e.g., CINR)

Obtain the median value from the CDF curve of the metric, i.e., $\overline{X}$

With a reliability target, locate the target value of the metric on the CDF curve, i.e., $X_{target}$ The fade margin output in dB is simply the difference between the two: i.e. fade margin=$\overline{X}-X_{target}$ Calculation of Terrain PL Terrain PL
=PL(use-case model, link type)
+calibration term
+additional loss due to RF environment
+fade margin Antenna Gain Prediction In a fixed wireless backhaul network directional antennas are often used in order to maximize the performance and/or link budget of a link. The calculation of antenna gain is a summation of transmitter gain and receiver gain, that is:

$$\text{Ant}_{gain}\text{ (dB)}=Tx_{gain}\text{ (dB)}+Rx_{gain}\text{ (dB)}$$

Steps of the method for Antenna Gain Prediction according to an embodiment are illustrated schematically in FIGS. 13 to 16. Antenna gain prediction is based on ITU-R M.2135 (for azimuth) and WINNER+D5.3 (for elevation).

Figure 14:
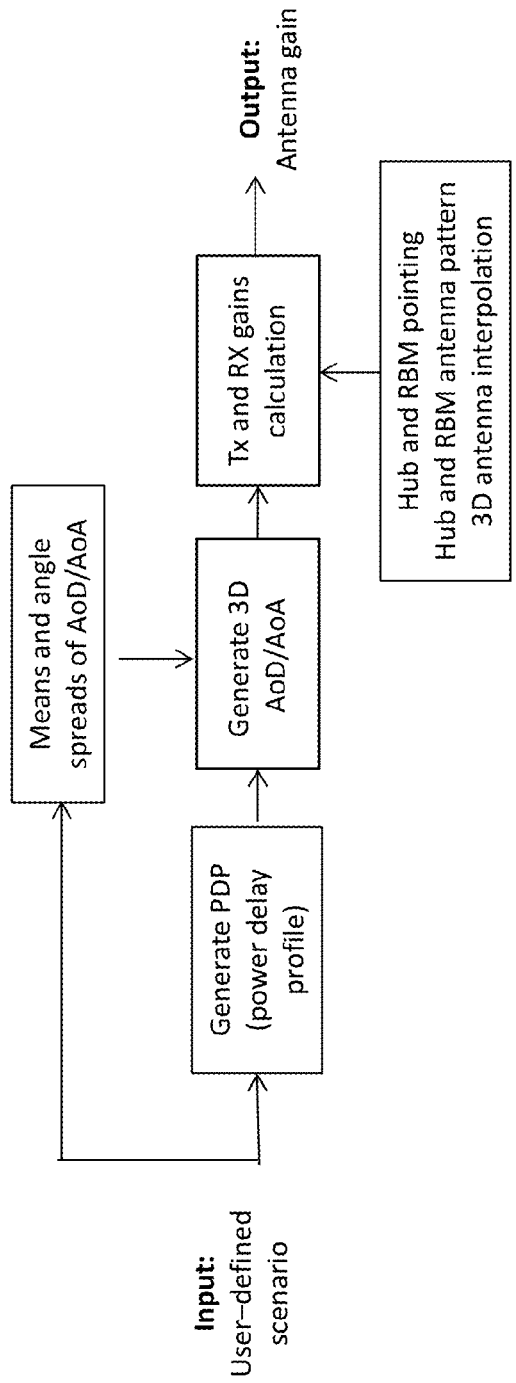
FIG. 14 shows a flowchart illustrating more details of the user inputs and workflow for antenna gain computations.
Figure 15:
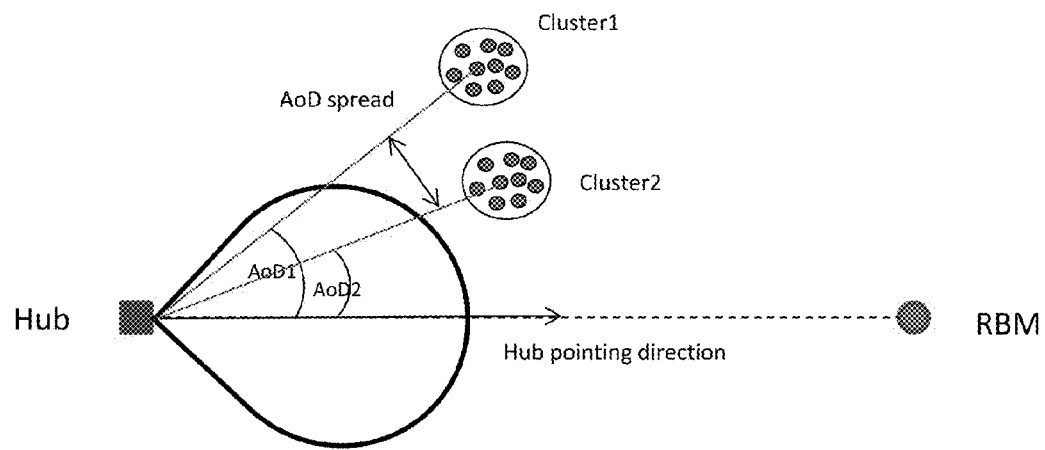
FIG. 15 shows a schematic diagram illustrating determination of a mean Angle of Departure (AoD) and angle spread of the AoD for antenna gain prediction.
Figure 16:
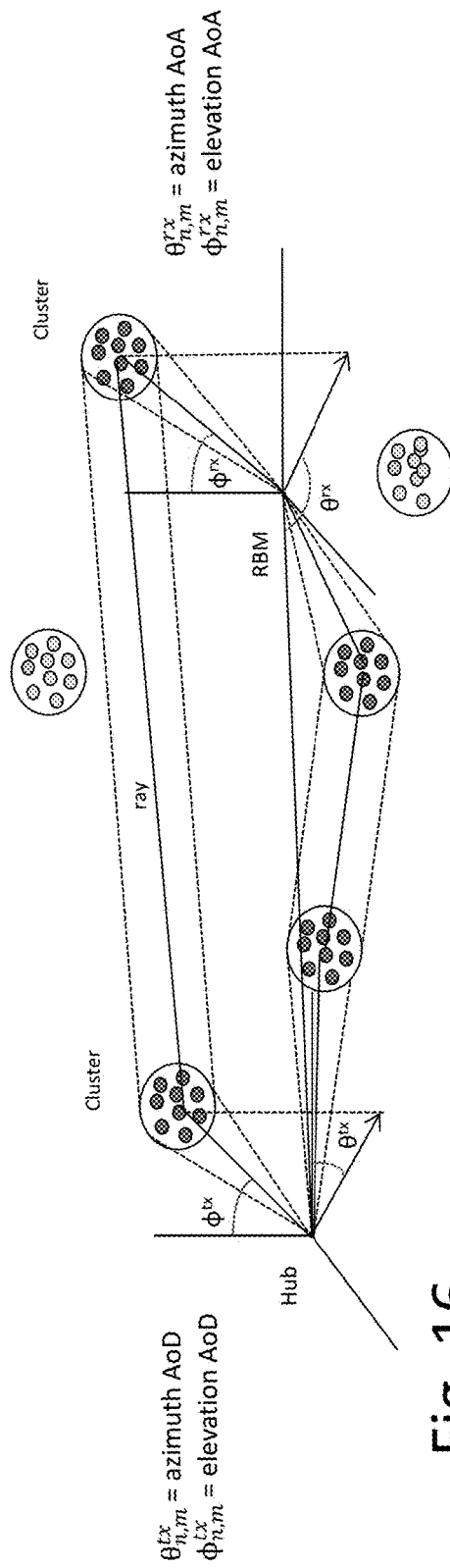
FIG. 16 shows a schematic diagram illustrating a 3D double bounce model for antenna gain prediction, according to an embodiment of the present invention.

Referring to the antenna gain workflow shown FIG. 14, the input comprises a user-defined scenario e.g. Downtown, Urban, Suburban, etc., or site survey data, if it is available. A power delay profile (PDP) is generated. Optionally user inputs include mean and angle spreads of the Angle of Departure (AoD) and Angle of Arrival (AoA), as represented schematically in FIG. 15. A 3D double bounce representation of AoD/AoA may be generated as illustrated schematically in FIG. 16. Then Tx and Rx gains are calculated, using inputs comprising one or more of Hub and RBM pointing directions, Hub and RBM antenna patterns and 3D antenna interpolation.

Stage B. Network Planning for Backhaul Network Design and System Design

Figure 17:
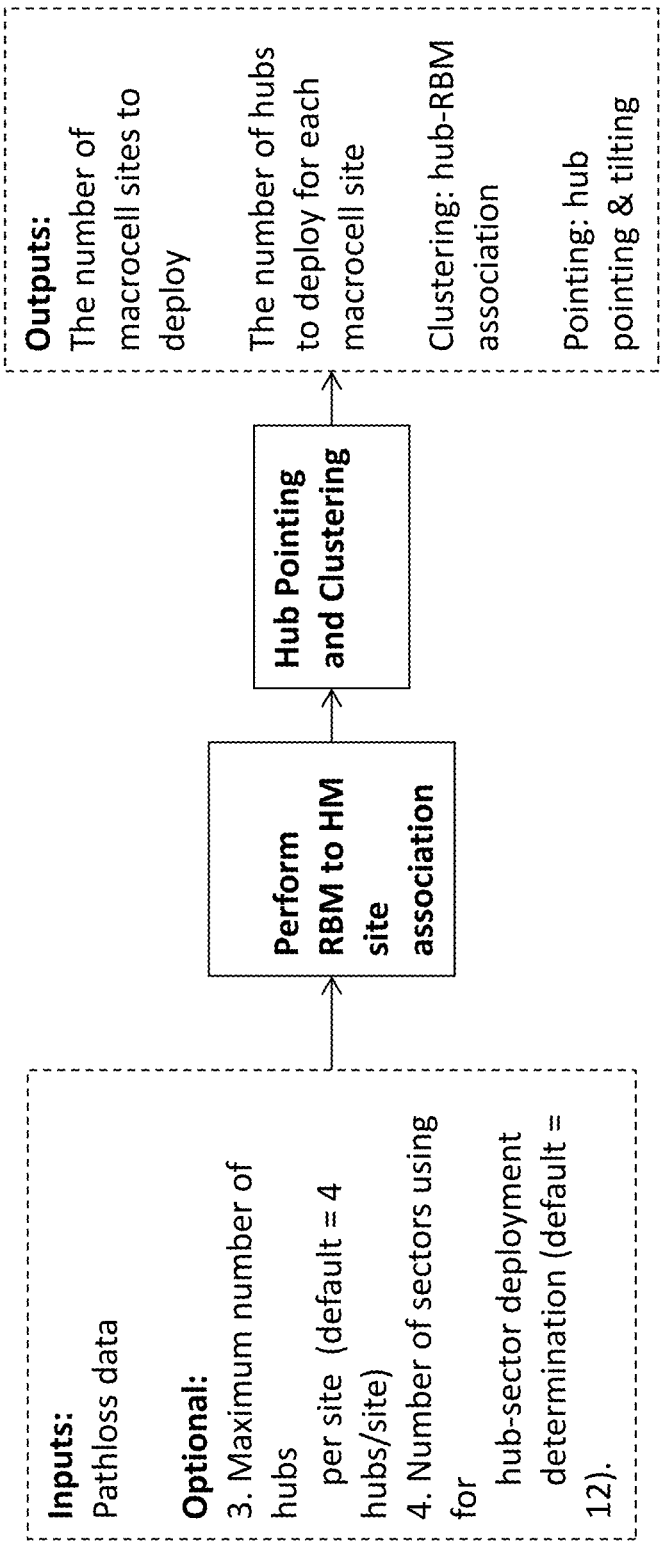
FIG. 17 shows a chart representing the workflow for a method of network planning of a fixed wireless backhaul network, comprising steps of site association and hub pointing and clustering, according to an embodiment of the present invention.

This stage of network planning comprises two main steps: first site association and, subsequently, hub-pointing and clustering algorithms that define the network topology, as illustrated schematically by the flowchart in FIG. 17.

In a dual-carrier system, inputs defining a network topology comprise masked pathloss data for the first carrier and pathloss data for the second carrier.

$$PL\text{ (unmasked)}=\text{Terrain PL}$$

$$PL^*\text{ (masked)}=\text{Terrain PL}+TX\text{gain}+RX\text{gain}.$$

All PL are 360 degrees sweep in azimuth and up to 180 degrees in elevation. In one embodiment, the method comprises predicting the PL for every 0.5 degrees in AZ pointing (360 degrees) and every 0.25 degrees from 0 degrees to 4 degrees in EL downtilt. Optionally, inputs may comprise the maximum number of hubs per site and the number of sectors used for hub-sector deployment determination.

Considering the available candidate Hub and RBM sites, determine a network topology for the backhaul network, e.g., single-hop or multi-hop.

Figure 18:
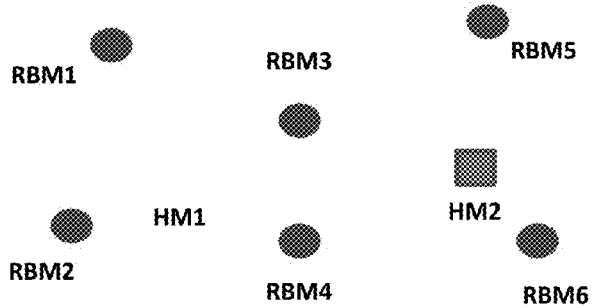
FIG. 18 shows a schematic diagram illustrating a method for site association using a hub centric model.
Figure 18:
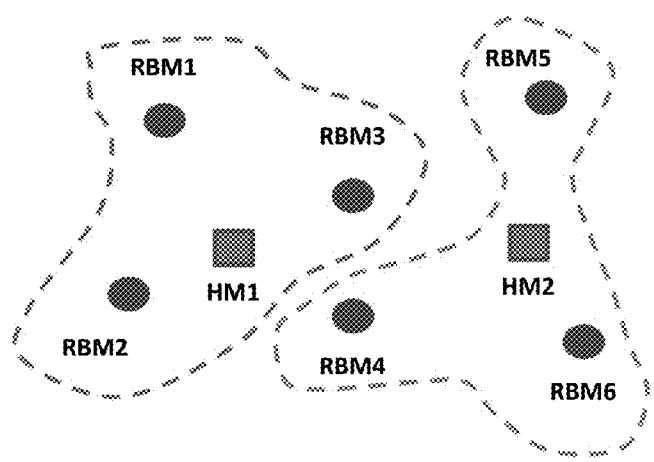

Perform RBM to HM association;
For each HM site and its served RBMs, perform joint hub pointing, hub deployment (hub dimensioning) and RBM pointing;
If the performance, e.g. committed information rate (CIR), of RBMs given the current network topology and configuration is not satisfactory, a variety of interference management schemes may be implemented for link budget challenged or interference challenged RBMs, including:
Joint carrier assignment
Channel assignment—frequency reuse
Power control Site association algorithms may comprise a simple hub-centric association by an iterative ranking process as illustrated schematically in FIG. 18. The metric used for hub-association may be the Terrain PL (unmasked); spectral efficiency (SE) or CINR. The RBM-site association is then made for all candidate sites. For hub-centric site association, based on the selected metric(s), the RBMs for each HM are ranked from best to worst in each of several rounds, until all RBMs are associated with a HM.

The initial hub association may be enhanced by a subsequent process step. For example, for a gradient-based method, the output from the initial hub centric association is used as an initial site-RBM vector input for a gradient based optimization based on additional parameters, e.g., wherein the sum log throughput is maximized with loading, i.e. the number of RBMs associated to each site.

$\text{Maximize}_{K_j,x_{ij}} \Sigma_i \log(R_i)$
subject to:

1) $R_i = \sum_j \dfrac{W}{K_j} \log(1 + CINR_{ij}) x_{ij}$

2) $K_j = \sum_i x_{ij}, \forall j.$ % loading = numbers of *RBMs* associated to that site -continued 3) $K_j \leq K$ % limit the number of *RBMs* associated to one site 4) $\sum_j x_{ij} = 1, \forall i.$ % one *RBM* associates to one site 5) $x_{ij} \in \{0, 1\}$ % site-*RBM* associate vector To compute CINR, the effect of hub pointing is ignored, i.e. an omnidirectional antenna is assumed for all hub sites, although a directional antenna is still considered at the receiver RX.

The problem is non convex—the solution can be local optimum and so an initial RBM $x_{ij}$ has to be chosen carefully.

Site Association Example: Ottawa Downtown

Figure 19:
FIGS. 19 to 21 show map views to illustrate schematically steps of a method for network planning in a wireless backhaul network for an example using a downtown area in the city of Ottawa.

As illustrated in FIG. 19, a map view is shown for an example scenario which comprises 5 candidate macro sites and 24 small cells. To obtain optimal performance or achieve a required throughput requirement, given candidate macro sites and small cell locations, the method is used to predict PL. The required outputs are:

How many macro sites are required and at which macro sites are hubs to be installed;

Dimensioning: how many hubs are required for each deployed macro site;

Clustering: how are hubs and RBMs associated;

Pointing—the hub pointing and tilting directions.

Figure 20:
Figure 21:

As illustrated in FIG. 20, results are illustrated in a map view for an example in which each RBM is associated to a serving hub to obtain the best utility with 5 macro sites, with the hub-RBM association or clustering being shown in the table. FIG. 21 shows the map view with a representation using graphical output that is provided to show the results of hub clustering, shown in the table, and pointing, as indicated by arrows extending from each hub module. FIGS. 22A, 22B and 22C show, respectively, an enlarged graphic and a map for site 1 only, and tabular output data for the hub-RBM associations for each of 4 hubs, including hub pointing and downtilt for each of four hub antenna beams. FIGS. 23A, 23B and 23C each show a similar enlarged graphic, map and tabular data for site 2 only, for each of 3 HMs. Similar results for sites 3, 4 and 5 are shown, respectively in FIGS. 24A, 24B and 24C; FIGS. 25A, 25B and 25C; and FIGS. 26A, 26B and 26C.

Hub Association Example: Washington Downtown

Figure 27:
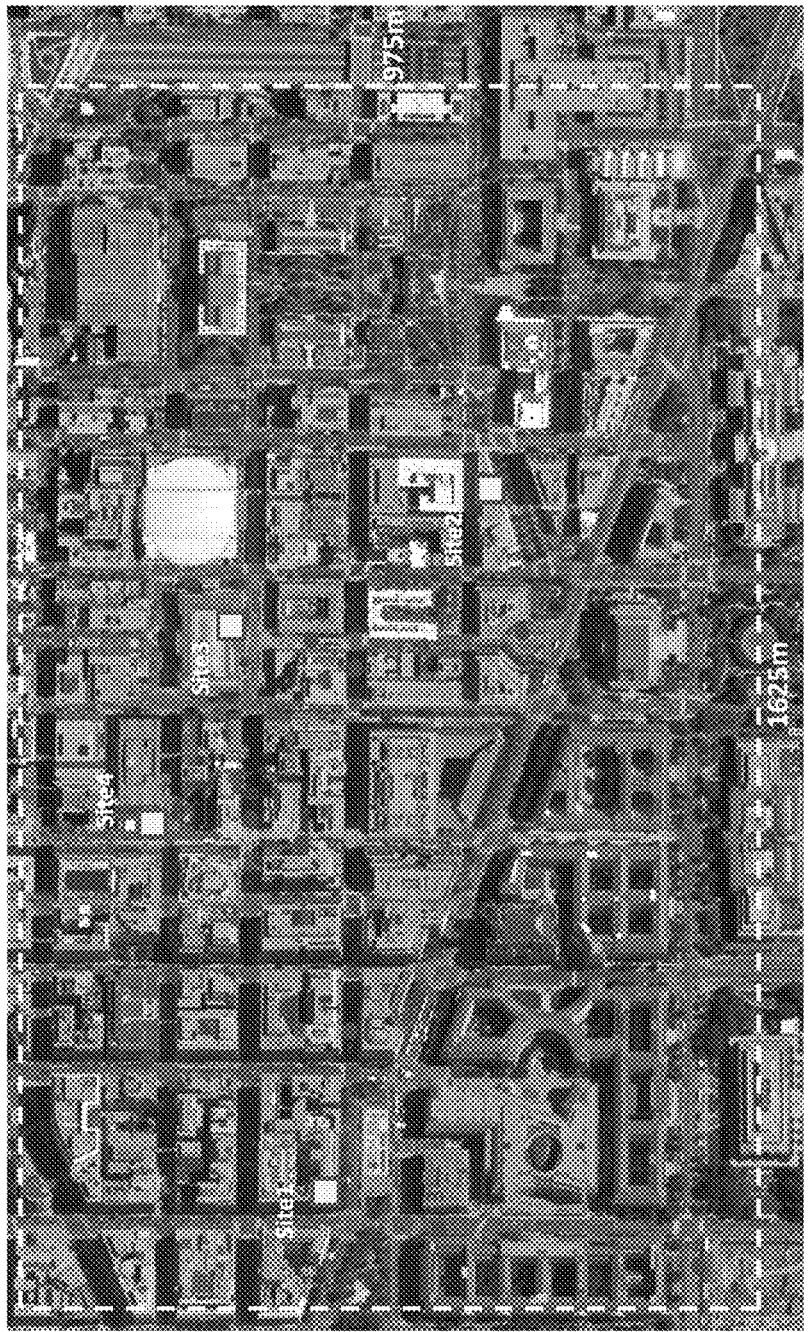
FIGS. 27 to 29 illustrate schematically steps of a method for network planning in a wireless backhaul network for an example for a downtown area of Washington D.C.
Figure 28:
Figure 29:

As illustrated in the map views in FIGS. 27, 28 and 29, an example of a downtown scenario comprises 4 candidate macro sites and 16 small cells. FIG. 27 shows the map view for Topology 1, showing RBM-hub associations, with 2 RBMs per hub, 1 LOS and 1 NLOS. FIG. 28 shows a map view with hub deployments, hub pointing and downtilt for each hub. These results are also summarized in the output table shown in FIG. 29. Corresponding performance evaluation results are set out in FIG. 30 for Topology 1 for single carrier 5.8 GHz only. The results shown in FIG. 31 indicate that 5 RBMs (2, 3, 6, 8, and 14) are link budget challenged and 1 RBM (12) is interference challenged.

To improve performance, LOS relays may be deployed for some RBMs, e.g. relays R1, R2 and R3 respectively for RBMs 2, 8 and 14. Dual carrier assignments and channel assignments are made for interference management. After network optimization, the improvements in performance results are shown in FIG. 32, to indicate that all RBMs satisfy the CIR requirement.

Stage C. Small Cell Deployment

An operator may decide to deploy small cells to improve network performance for one or more reasons, for example, to fill coverage gaps that exist in the existing service (e.g. coverage holes); to introduce new high QoS services or enhance service coverage (e.g. higher cell-edge rate); to provide adequate capacity to cater for the growing demand; to provide service to hot spots; and to provide blanket capacity enhancement.

Many operators are interested in Heterogeneous network (HetNet) deployments with large macro-cells in combination with small cells. Deploying small cells (SCs) strategically on top of an existing macro-only system can improve system performance such as capacity and coverage. Small cells may be deployed to solve one or more of the above problems, whether these problems currently exist or are forecast to happen in the future.

One known approach is to perform an exhaustive search of feasible candidate positions for each SC. However, the computational complexity of an exhaustive search grows exponentially with the number of SCs and the number of candidate positions.

Another issue is that most, if not all, of known SC deployment use cases consider only the performance of the access network, without considering the end-to-end link performance, including the backhaul link performance. For example, existing known small cell deployment methods include:

Random deployment use case—SCs are randomly deployed (for benchmarking)

Coverage use case—SCs are placed at the locations with the lowest downlink CINRs Capacity use case—SCs are placed at the center of a UE cluster, such as, traffic hot spots For example, if, in the coverage hole area, there are three feasible sites, e.g. three lamp posts on which a SC can be deployed, all three sites can be tried. The typical procedure is to pick the one that works best for access. Then a backhaul link is added, hoping that the backhaul link has larger capacity than the access link.

A method of network planning comprising optimizing small cell deployment, based on a sum utility function, such as sum throughput performance, according to an embodiment of the present invention jointly considers the access and backhaul link performances to determine a SC location based on end-to-end performance of both the access and backhaul links. Beneficially, the "Sum Utility" method provides for flexible system design methodology wherein the objective for SC deployment can be changed simply by modifying the utility function, so that capacity, coverage, QoS, and/or other performance measures can be improved.

Figure 33:
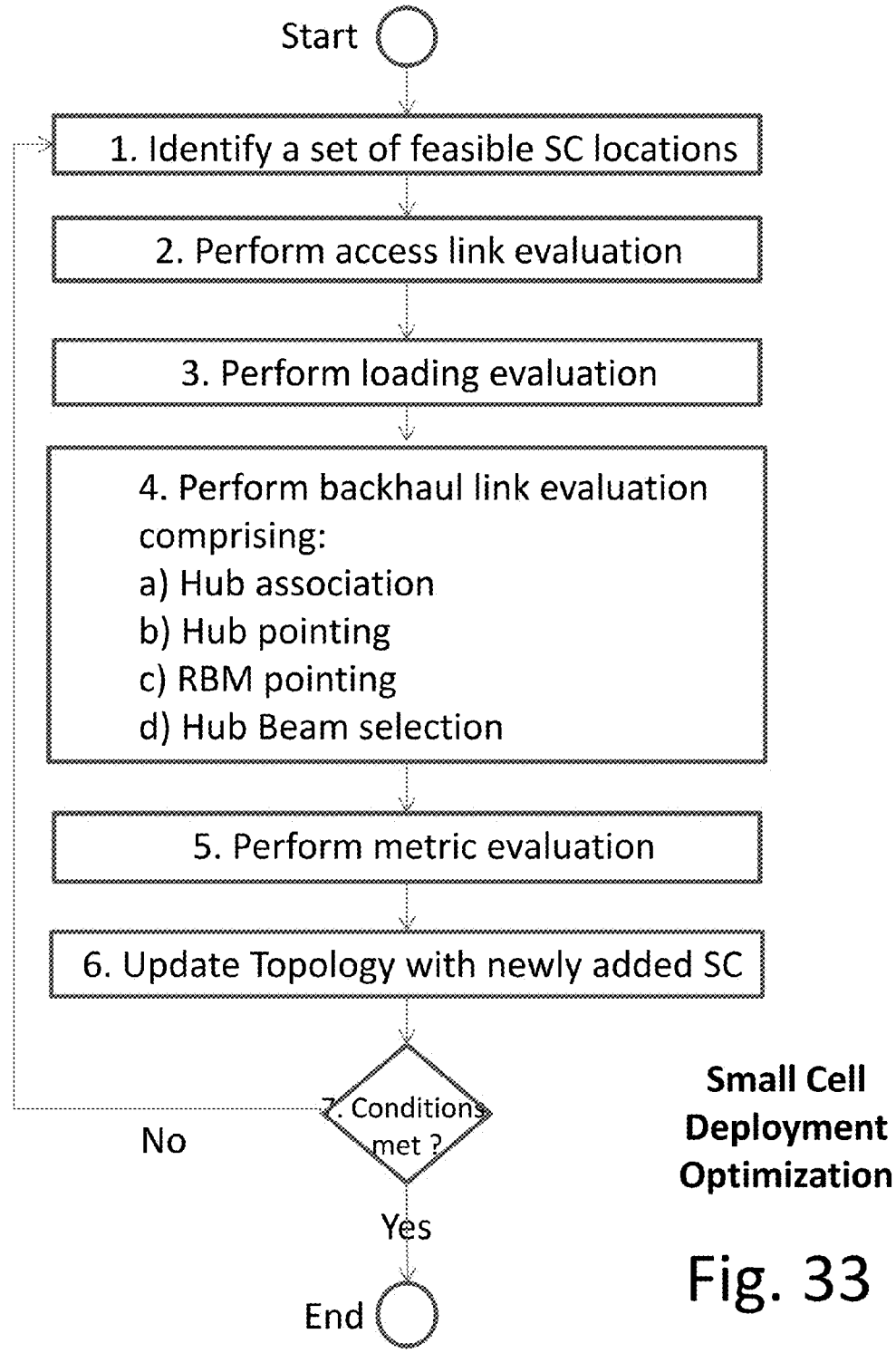
FIG. 33 illustrates schematically a workflow for a method of network planning for a fixed wireless backhaul network comprising optimization of small cell deployment in according to yet another embodiment of the present invention.

The method is illustrated schematically in the flowchart shown in FIG. 33, and comprises the following steps:

1. SC location identification
2. Access link evaluation
3. Traffic load evaluation
4. Backhaul link evaluation comprising:
   a. Hub association
   b. Hub pointing
   c. RBM pointing
   d. Hub beam selection
   e. RBM beam selection
5. Metric evaluation
6. Topology update If the result of the metric evaluation does not meet a required condition or metric, e.g. a required throughput, these steps 1 to 6 are repeated until the required condition or performance metric is met.

Figure 34:
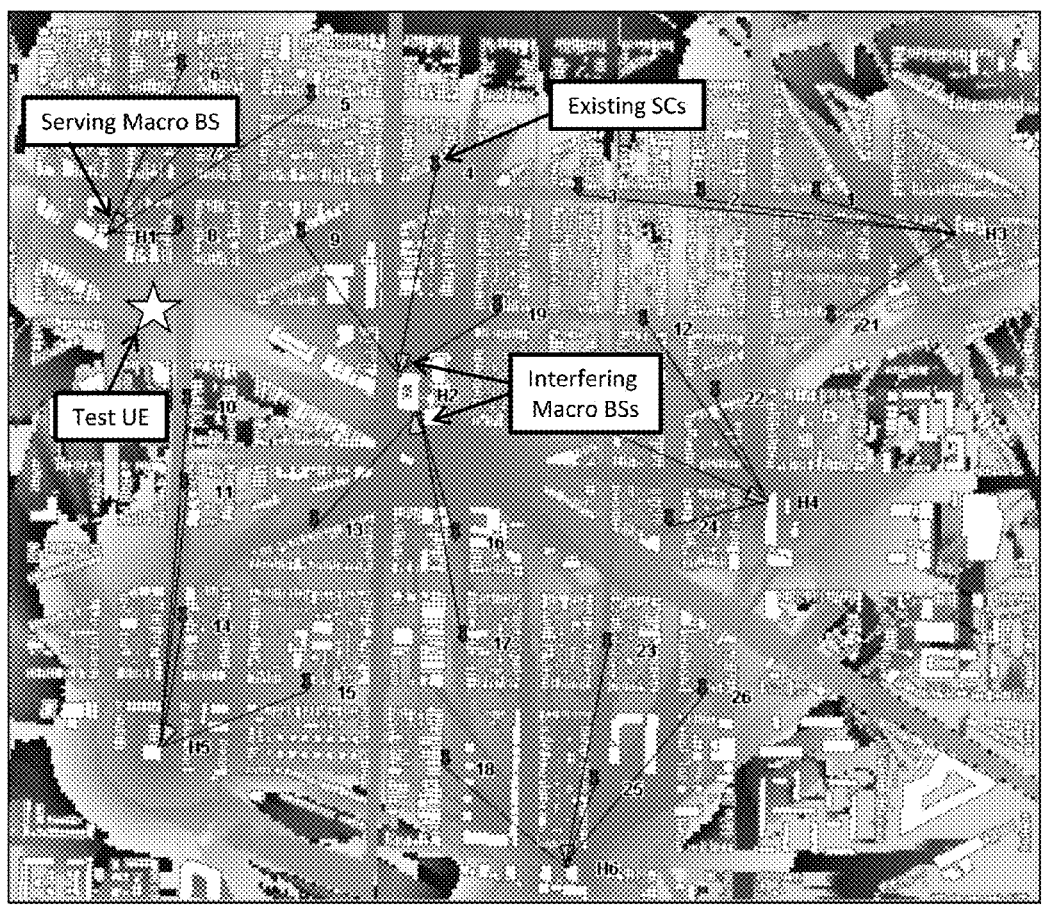
FIGS. 34 to 36 show map views to illustrate schematically the steps of a method for network planning comprising optimization of small cell deployment in wireless backhaul network using, as an example, a downtown area of Washington D.C.

Steps 1 to 3 are illustrated schematically in FIG. 34, which shows a map view indicating existing serving macro base stations (Macro BS), interfering Macro BSs, and existing SCs. These steps comprises:

1. Identifying feasible SC locations, comprising dividing the network area into several candidate regions (e.g., 10 m×10 m).

2. Performing access link evaluation, by considering a test user equipment (UE) as if this test UE is placed in each candidate region at location (i, j), calculating the throughput for each UE, i.e. the access link throughput, by calculating the CINR and, given a user-defined bandwidth allocation scheme per carrier, recording the throughput and the serving SC, given the current topology.

3. Performing traffic load evaluation for estimating an expected amount of traffic within each candidate region.

4. Performing Backhaul Link Evaluation

Figure 35:
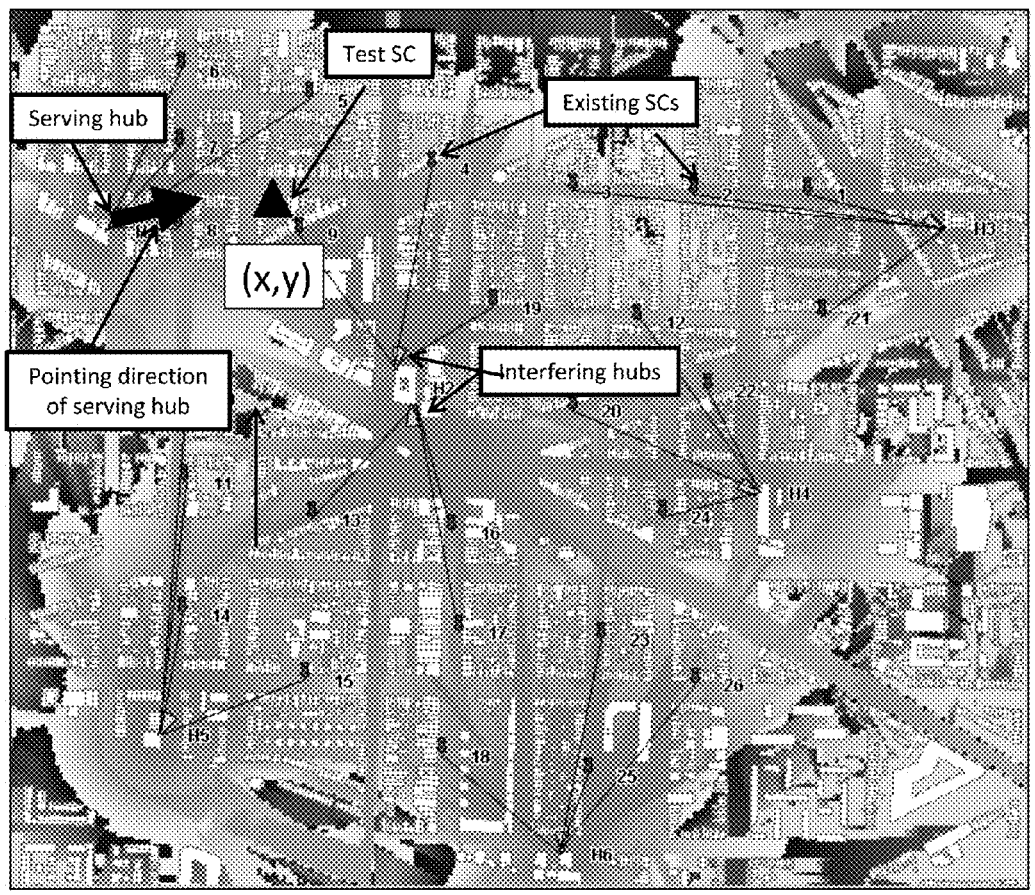

Step 4 is illustrated schematically in the map view shown in FIG. 35.

This step comprises considering a test SC as if this test SC is installed at a feasible pole location (i, j) and computing its throughput, i.e. its backhaul link throughput, by the following steps, as described above:

Site association—associating an RBM to a proper serving site;

Hub association—deploying hubs at a site and associating an RBM at a SC site to a proper serving hub;

Hub pointing—adjusting a hub pointing to improve the desired strength of its served RBMs and to cut down the interference caused to RBMs in other sectors;

RBM pointing—adjusting the RBM pointing to reduce the pathloss and maximize the receive antenna gain;

Hub beam selection (optional)—if a Hub is equipped with a multi-beam antenna, RBMs pick a hub beam to maximize the network performance;

RBM beam selection (optional)—if RBMs are equipped with multiple antenna beams, select an RBM beam to maximize the network performance.

Feasible pole locations for small cells are generally provided by operators, and the SC or RBM installation restrictions are typically governed by city by-laws and safety guidelines.

When required, hub beam selection may be implemented as described in the Applicant's above referenced related U.S. patent application Ser. No. 14/255,068.

Figure 36:
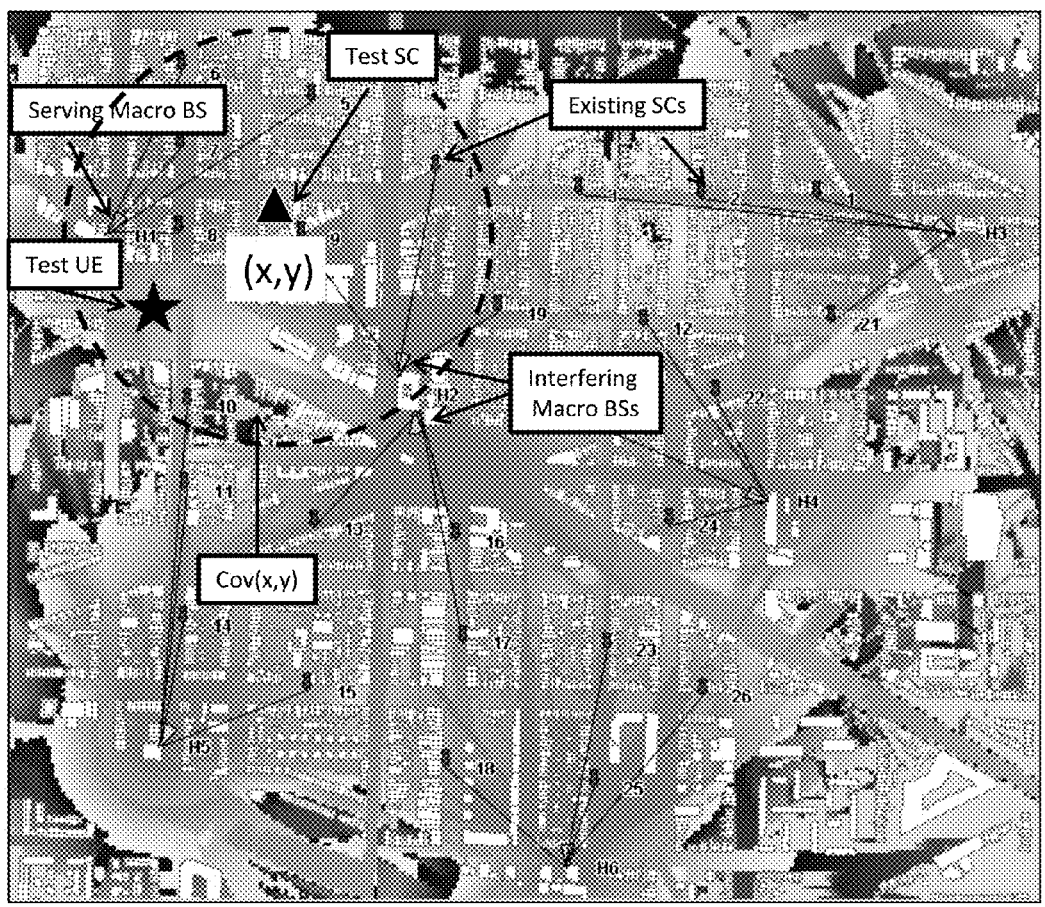

Steps 5 and 6 are illustrated schematically in the map view shown in FIG. 36.

5. Performing metric evaluation comprising: Computing the selected metric, i.e., a utility function, of each feasible SC or pole candidate location, and considering an SC in the location that maximizes the metric. That is, for each SC candidate position (x, y), compute its sum utility as if an SC is dropped at (x, y).

6. Performing a topology update by updating the topology with the newly added SC by considering an SC at (x, y) such that the sum utility of (x, y) is maximized.

If the required target metric is not met, the sequence of method steps 1 to 6 is repeated, as required.

Required Inputs

Available hub site locations;

PL information of any hub site to any RBM location for each carrier (e.g. in dual carrier networks, PL information is needed for both the first and second carriers);

PL (pathloss) from Macro nodes to UEs for computing the direct macro access link performance;

PL from hubs to RBMs for computing the backhaul link performance after hub beam selection and/or RBM beam selection;

PL from SCs to UEs for computing the small cell access link performance;

Traffic load.

The sum utility use case for optimizing small cell deployment is based on a utility function, such as sum log throughput, so that each SC is placed in the location such that its utility is maximized. This method provides improved performance relative to known methods disclosed herein. The objective of SC deployment can be made flexible by modifying the utility function, whereby capacity, coverage, and/or other performance measures can be improved. This method has much lower computational complexity than an exhaustive search.

In summary, improved systems and methods for network planning in wireless backhaul network are disclosed.

The disclosed method comprises one or more of terrain pathloss (PL) and antenna gain prediction; network design comprising site association, hub dimensioning and pointing; and optimization of small cell (SC) deployment. PL prediction is based on correlation of user input parameters with reference use cases for channel models for each of downtown, urban, and suburban deployment scenarios. A set of reference use cases enable rapid and effective network planning is achieved with limited input data, even in the absence of high resolution digital maps or building polygons, by modelling a proposed network using a channel model having a highest correlation with available environmental parameters, e.g. information from elevation and clutter maps, e.g. average building heights and street widths. Optimization of network topology design, system design including interference management, and small cell deployment with both access link and backhaul link evaluation is based on optimization of a sum-utility function across all links for feasible SC site locations.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for network planning in a fixed wireless backhaul network comprising a plurality of nodes, wherein each node comprises at least one hub module (HM) at each macro-cell site, and each hub module serves a set of remote backhaul modules (RBMs) through hub-RBM radio links, each RBM being located at a small cell (SC) site, and wherein the method comprises terrain pathloss (PL) prediction comprising steps of:

providing a reference set of use cases, each use case comprising a channel model for one of a plurality of deployment scenarios for downtown, urban and suburban use cases;

obtaining user input parameters relating to an actual deployment scenario to be planned;

finding a correlation between said user input parameters and parameters of one or more of the use cases of the reference set of use cases;

based on said correlation, selecting a most appropriate one of the reference set of use cases, and obtaining therefrom further parameters for the respective channel model for the selected use case;

obtaining user inputs comprising HM and RBM locations, an elevation map and clutter height map;
performing a link type determination to identify Line-of-Sight (LOS) and Non-Line-of-Sight (NLOS) link types for each feasible HM-RBM link;
calculating a terrain PL for each HM-RBM link based on the further parameters for the respective channel model for the selected use case and the link type determination,
wherein the terrain PL for each HM-RBM link comprises a predicted PL based on the respective channel model and link type determination; the method further comprising performing RBM to HM site association, using inputs comprising said terrain PL for each HM-RBM link, evaluating a predicted performance metric for each HM-RBM link, and updating the RBM to HM site association until a target performance metric is met for each HM-RBM link.

2. The method of claim 1, further comprising one or more of channel calibration, Radio Frequency (RF) environment identification and fade margin computation, and wherein Terrain PL for each HM-RBM link comprises the predicted PL based on the use-case model and link type, and on one or more of a channel calibration term, an additional loss term based on an RF environment identification, and a fade margin.

3. The method of claim 2, wherein the link type determination comprises link type determination based on a Fresnel zone (n, p) where n is the order of a Fresnel zone and p is the obstruction allowance.

4. The method of claim 1, wherein performing a link type determination further comprises outputting for each link a LOS link or NLOS link condition and point-to-point link profile plot for each link.

5. The method of claim 1, wherein obtaining user input data further comprises obtaining parameters from survey data.

6. The method of claim 1, further comprising performing channel calibration comprising calibrating statistical models to pathloss vs. distance with one or more of Radio Frequency (RF) planning predictions and field measurements for the selected reference use case.

7. The method of claim 6, wherein channel calibration comprises, for each distance d, computing the PL difference between a predicted curve and each statistical model (delta PL); and
finding a curve that fits this delta PL curve against distance such that the mean PL error is zero.

8. The method of claim 7, further comprising applying curve smoothing to predicted data and then curve fitting based on a linear curve and/or based on a higher order polynomial curve.

9. The method of claim 1, further comprising Radio Frequency (RF) environment identification wherein based on user input data from one or more of clutter maps, polygon maps and ray-tracing, determining an RF environment from one of a set of available RF environment models comprising one or more of:
LOS+reflection,
LOS+scattering,
NLOS+reflection,
NLOS+diffraction,
NLOS+canyon, and
other applicable models.

10. The method of claim 9, further comprising, after the step of RF environment identification, performing fade margin computation comprising:
obtaining a cumulative distribution function (CDF) curve of a target metric;
obtaining a median value $X_m$ of the metric from the CDF curve $X_m$;
locating a target value $X_{target}$ of the metric on the CDF curve;
computing a fade margin $(dB)=X_m-X_{target}$.

11. The method of claim 1, further comprising performing antenna gain prediction comprising:
obtaining inputs comprising:
HM coordinates of each HM,
RBM coordinates of each RBM,
a channel model for the selected use case,
a respective link type of each link;
generating a power delay profile (PDP);
optionally, obtaining Angle of Departure (AoD) and Angle of Arrival (AoA) values;
obtaining a HUB and RBM pointing and antenna pattern and performing 3D antenna interpolation; and
calculating RX and TX gains for each hub RBM link.

12. The method of claim 1, wherein
the Terrain PL
=PL as a function of use-case model and link type
+a calibration term
+additional loss due to Radio Frequency (RF) environment
+fade margin
and wherein the fade margin is based on an RF environment identification and a reliability target.

13. A method for network planning in a fixed wireless backhaul network comprising a plurality of nodes, wherein each node comprises at least one hub module (HM) at each macro-cell site, and each hub module serves a set of remote backhaul modules (RBMs) through hub-RBM radio links, each RBM being located at a small cell (SC) site, and wherein the method comprises:
determining a network topology for backhaul links wherein the network topology comprises one or more of a single-hop and a multi-hop topology by steps comprising:
a) obtaining user inputs comprising:
coordinates of each HM and RBM;
pathloss (PL) values for each hub-RBM link, per carrier, and per hub beam;
a selected utility function;
b) performing RBM to HM site association based on a selected metric comprising one of Terrain PL, spectral efficiency or Carrier to Interference plus Noise Ratio (CINR), for each Hub RBM link, to provide a RBM-site association for possible candidate site combinations;
c) performing for each HM site and its served RBMs:
joint hub pointing;
hub deployment comprising hub dimensioning;
hub association;
RBM pointing;
comprising sweeping all parameters to maximize the utility function;
d) generating output comprising:
a number of macro-cell sites to deploy;
a number of hubs to deploy for each macro-cell site;
clustering comprising hub-RBM associations;
pointing comprising hub pointing and tilting;
e) evaluating a predicted performance metric of each hub-RBM link based on said outputs; and
if required, repeating steps b) to e) until a selected performance metric is met.

14. The method of claim 13, wherein the performance metric comprises throughput requirements.

15. The method of claim 13, further comprising selecting an interference management scheme comprising one or more of:
dual carrier assignment;
channel assignment-frequency reuse; and
power control;
to meet target throughput requirements for each hub-RBM link.

16. A method for network planning in a fixed wireless backhaul network comprising a plurality of nodes, wherein each node comprises at least one hub module (HM) at each macro-cell site, and each hub module serves a set of remote backhaul modules (RBMs) through hub-RBM radio links, each RBM being located at a small cell (SC) site, and wherein the method comprises optimization of small cell deployment by jointly considering the end-to end performance of both access links and backhaul links, by steps comprising:
a) selecting a performance metric comprising a utility function to be optimized;
b) obtaining input data defining the network topology comprising:
a set of feasible SC site locations; and
PL information for each site to each RBM for each carrier and each hub beam;
c) performing access link evaluation comprising:
dividing a network area into a plurality of candidate regions;
for a test user equipment (UE) placed in each candidate region, computing a throughput for an access link between the UE and for each feasible SC site location to obtain an access link evaluation;
obtaining a traffic load evaluation comprising obtaining an estimation of the amount of user traffic in a candidate region;
d) performing backhaul link evaluation comprising:
for a test SC placed at each feasible SC site location, computing a backhaul throughput wherein computing backhaul throughput comprises performing one or more of:
Hub association,
Hub pointing,
RBM pointing,
Hub beam Selection;
RBM beam Selection;
e) computing a metric using said utility function for each feasible SC candidate location, and selecting a new SC location that maximizes the metric;
f) outputting the new SC location and performing a topology update with the newly added SC:
g) evaluating whether a desired target value of the metric is met, and if not, repeating the above steps until a desired target value of the metric is met.

17. The method of claim 16, wherein obtaining input data further comprises obtaining one or more of RBM Quality of Service (QoS) requirements and ray tracing information.

* * * * *